United States Patent
Kimura

(10) Patent No.: US 8,473,685 B2
(45) Date of Patent: Jun. 25, 2013

(54) CACHE MEMORY DEVICE, PROCESSOR, AND CONTROL METHOD FOR CACHE MEMORY DEVICE TO REDUCE POWER UNNECESSARILY CONSUMED BY CACHE MEMORY

(75) Inventor: Hiroaki Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 285 days.

(21) Appl. No.: 12/826,967

(22) Filed: Jun. 30, 2010

(65) Prior Publication Data

US 2011/0004730 A1   Jan. 6, 2011

(30) Foreign Application Priority Data

Jul. 2, 2009 (JP) ................................. 2009-158146
Jun. 23, 2010 (JP) ................................. 2010-142780

(51) Int. Cl.
*G06F 13/00* (2006.01)

(52) U.S. Cl.
USPC ........... 711/133; 711/118; 711/119; 711/122; 711/44

(58) Field of Classification Search
USPC .......................... 711/118, 119, 122, 144, 133
See application file for complete search history.

(56) References Cited

U.S. PATENT DOCUMENTS

| 5,809,532 | A | 9/1998 | Eno et al. | |
|---|---|---|---|---|
| 6,202,139 | B1 * | 3/2001 | Witt et al. | 711/169 |
| 6,427,191 | B1 * | 7/2002 | Fu et al. | 711/131 |
| 6,725,339 | B2 * | 4/2004 | Fu et al. | 711/137 |

FOREIGN PATENT DOCUMENTS

| JP | 4-273549 | 9/1992 |
|---|---|---|
| JP | 2003-150446 | 5/2003 |

OTHER PUBLICATIONS

European Search Report for Application No. 10168161.7-1229; mailed Nov. 5, 2010.

* cited by examiner

*Primary Examiner* — Reba I Elmore
(74) *Attorney, Agent, or Firm* — Staas & Halsey LLP

(57) ABSTRACT

A cache memory device that is connectable to an instruction controlling unit for outputting a memory access request and a storage device. The cache memory device includes a data memory unit, a tag memory unit for holding status information of data, a search unit for searching for a cache line of the tag memory unit, a comparison unit, and a controlling unit. The controlling unit, when the comparison unit detects a cache miss, stops the supply of a clock to the data memory unit, if the cache line storing the data requested at the storage device is not present in the data memory unit, according to the status information.

18 Claims, 23 Drawing Sheets

FIG.13

| CLOCK CYCLE | 1 | 2 | 3 | 4 | 5 |
|---|---|---|---|---|---|
| PIPELINE | P1 | P2 | P3 | P4 | P5 |
| ACCESS COMPLETION | | | T304 | | ... |
| CACHE HIT/MISS | | | MISS | | |
| REQUEST DATA TO LOWER LEVEL CACHE | | T301 | T305 | | T309 |
| SUPPLY CLOCK TO TAG RAM 12 | T302 | | | T306 | |
| SUPPLY CLOCK TO TAG RAM 13 | | | | T307 | |
| SUPPLY CLOCK TO DATA RAM 14 | | | | | |
| READ OUT TAG/DATA | | T303 | | | |
| SEND DATA TO INSTRUCTION PROCESSOR 5 | | | T308 | ... | |

FIG.14

| CLOCK CYCLE | 1 | 2 | 3 | 4 | 5 |
|---|---|---|---|---|---|
| PIPELINE | P1 | P2 | P3 | P4 | P5 |
| ACCESS COMPLETION | | | T314 | | T320 |
| CACHE HIT/MISS | | | HIT | | |
| REQUEST DATA TO LOWER LEVEL CACHE | | T311 | T315 | | |
| SUPPLY CLOCK TO TAG RAM 12 | T312 | | | T316 | |
| SUPPLY CLOCK TO TAG RAM 13 | | | | T317 | |
| SUPPLY CLOCK TO DATA RAM 14 | | | | | |
| READ OUT TAG/DATA | | T313 | | | |
| SEND DATA TO INSTRUCTION PROCESSOR 5 | | | T318 | T319 | |

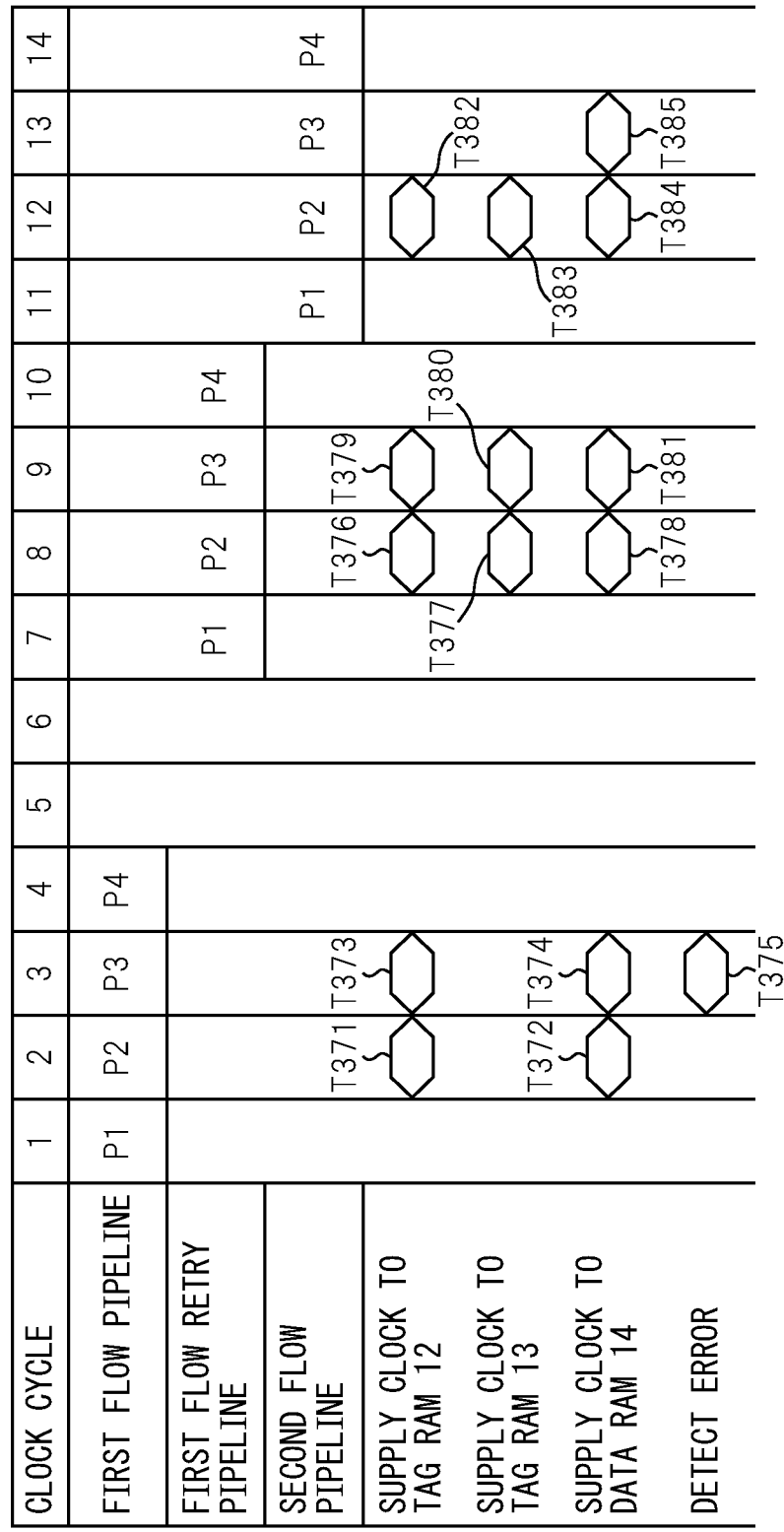

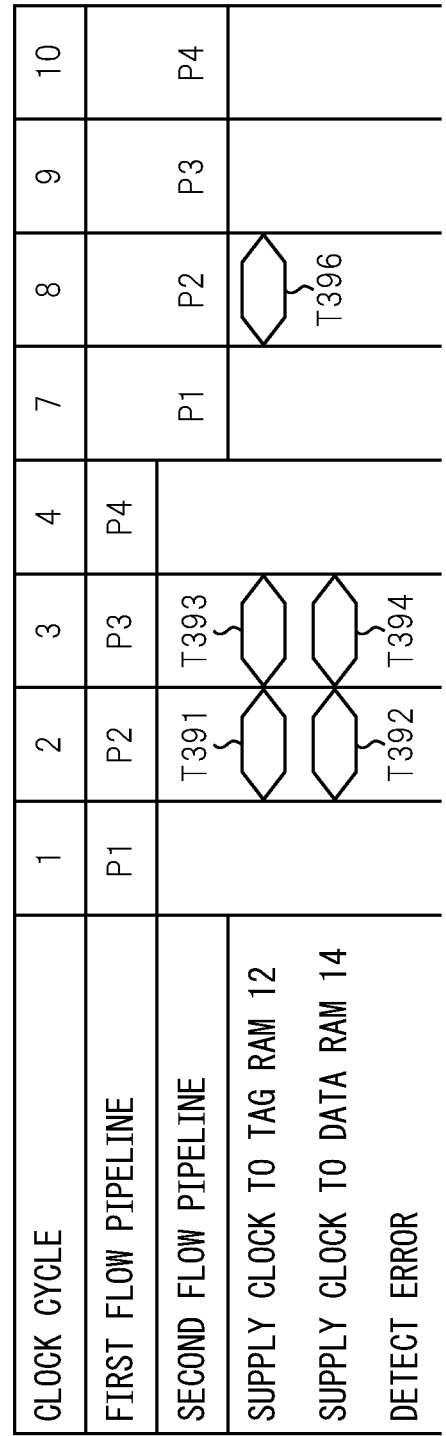

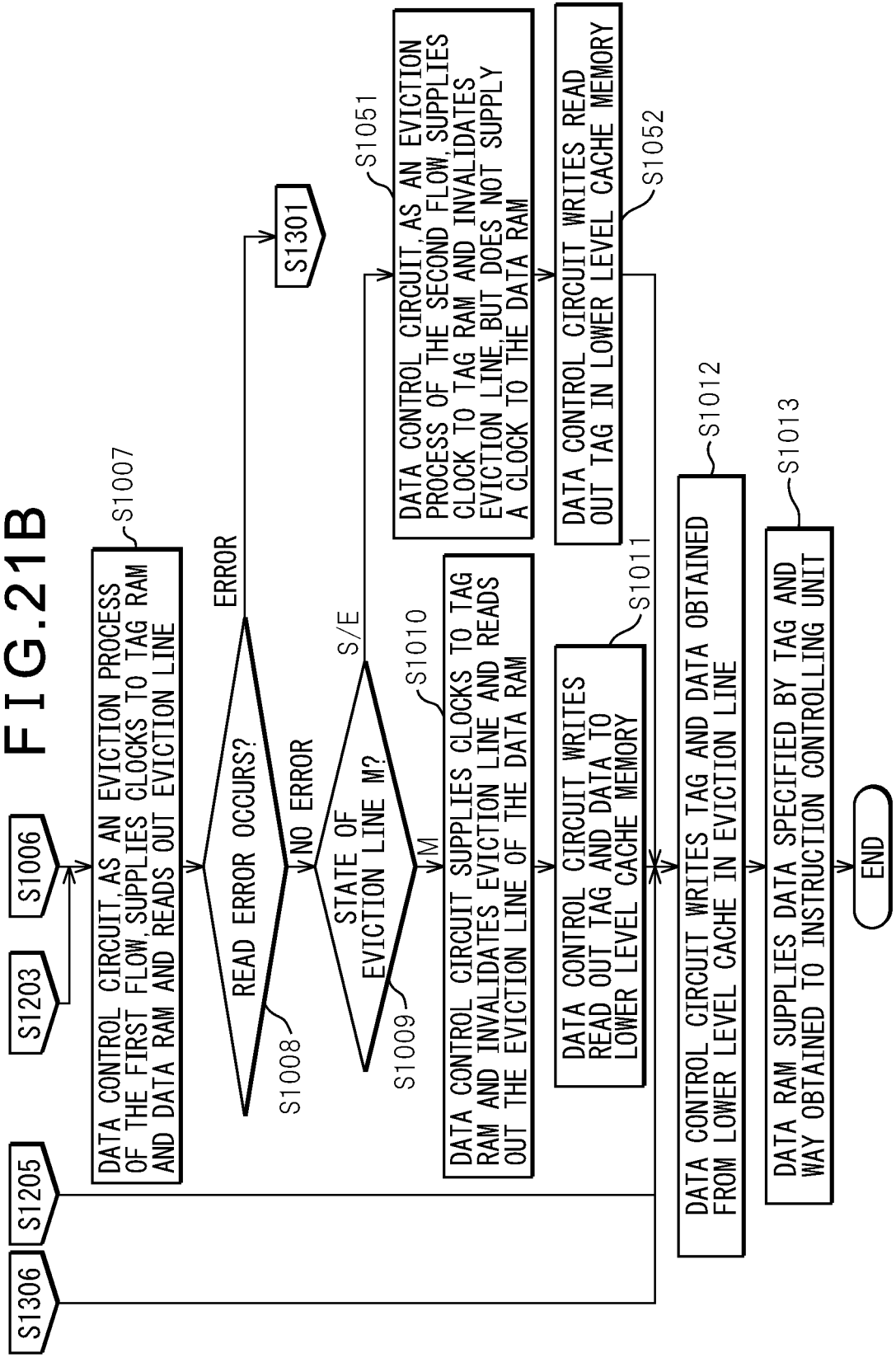

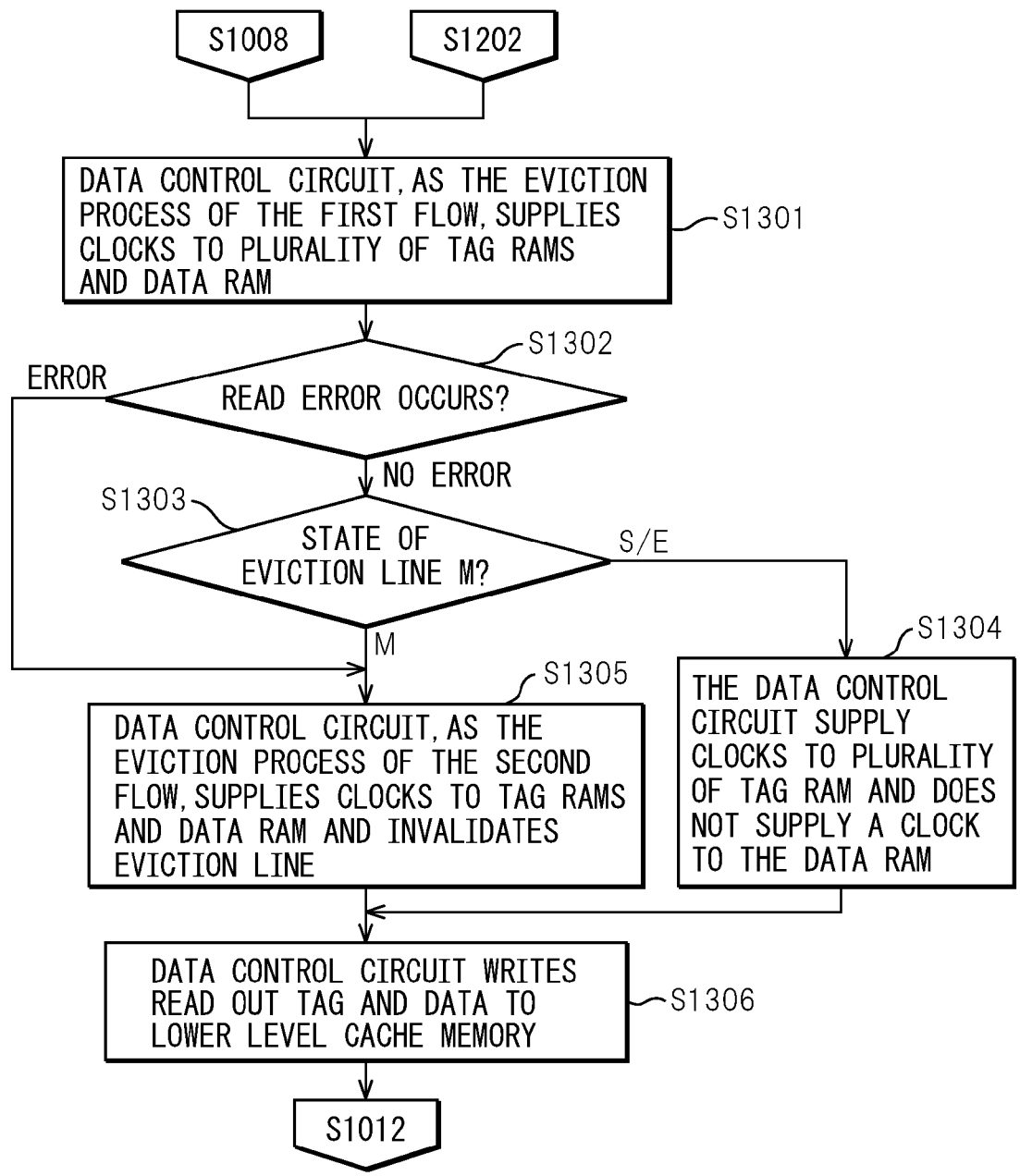

CACHE MEMORY DEVICE, PROCESSOR, AND CONTROL METHOD FOR CACHE MEMORY DEVICE TO REDUCE POWER UNNECESSARILY CONSUMED BY CACHE MEMORY

CROSS-REFERENCE TO RELATED APPLICATION

This application is based upon and claims the benefit of priority of the prior Japanese Patent Application No. 2009-158146, filed on Jul. 2, 2009, and 2010-142780, filed on Jun. 23, 2010, the entire contents of which are incorporated herein by reference.

FIELD

The embodiments discussed herein are related to a cache memory device, a processor, and a control method for the cache memory device.

BACKGROUND

A central processing unit (CPU), as a processor, has cache memories realized by a random access memory (RAM). The cache memories are used in a hierarchy of different sizes, for example, an L1 (Level 1: primary) cache memory and L2 (Level 2: secondary) cache memory. Further, the L2 cache memory includes the content of the L1 cache memory.

A cache memory consumes less power consumption the fewer the number of memory cells in the RAM accessed, so by storing frequently accessed data in a cache memory closer to the CPU core or other processor, it is possible to lower the power consumption of the cache memories overall.

A cache memory has been proposed having a data array for storing data, a tag array for storing tags relating to the data, and a comparator comparing a tag address as a physical address read out from the tag array and a tag address as a physical address requested to be read out from the outside. The tag array reads out tag addresses from the memory cells associated with an index address. When a tag address read out from the tag array and a tag array requested to be read out from the outside match, the comparator outputs a "cache hit" signal to the data array. The data array reads out the data from the memory cells specified by the index address after receiving a cache hit signal.

In this way, the cache memory searches through the tag array for a tag address corresponding to the index address and reads out the data from the data array only when there is a cache hit, that is, a match of a tag address included in the memory access request and a tag address read out from the tag memory. Therefore, when a cache miss occurs, data is not read out from the data array, so the power consumed for operating the data array can be suppressed.

Further, a cache memory has been proposed having a modify address storage unit for storing the addresses of written over data and cache memory blocks of predetermined ranges of addresses included in the cache memory. When a cache miss occurs in a data access operation from the processing unit, the cache memory determines a block to be evicted or purged from the cache memory based on a predetermined algorithm and searches for written over data in the block concerned with reference to the modify address storage unit. If there is written over data, the cache memory writes the written over data in the main memory and writes the data to be read from the main memory in the cache memory.

By selectively writing back the written over data in the main memory in this way, the wasteful operation of the cache memory writing data not written over in the cache memory back into the main memory when there is no need for writing it back can be eliminated.

[Patent Document 1] Japanese Laid-open Patent Publication No. 2003-150446
[Patent Document 2] Japanese Laid-open Patent Publication No. 4-273549

SUMMARY

According to an aspect of the embodiments, there is provided a cache memory device that connects an instruction controlling unit outputting a memory access request for requesting data and a storage device storing data, the cache memory device including: a data memory unit that holds data for each cache line, a tag memory unit that holds, for each cache line linked with a cache line of the data memory unit, tag addresses specifying storage positions of data covered by the memory access request at the storage device and status data indicating states of the data of the data memory unit corresponding to the tag addresses, a search unit that searches for a cache line of the tag memory unit corresponding to an index address included in the memory access request, a comparison unit that compares a tag address held in the found cache line of the tag memory unit and a tag address included in the memory access request and, when the two do not match, detects a "cache miss" and reads out the status information of the found cache line, and a controlling unit that, when the comparison unit detects a cache miss, requests data covered by the memory access request to the storage device and, when the cache line storing the data requested at the storage device is not present in the data memory unit, stops the supply of a clock to the data memory unit based on the status information of the cache line that the comparison unit read out.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 13 is a time chart illustrating an example of data access for a cache miss;

FIG. 14 is a time chart illustrating an example of data access for a cache hit.

FIG. 19 is a time chart illustrating an example of a tag eviction process;

FIG. 20 is a time chart illustrating an example of a tag eviction process;

FIG. 21B is a flowchart illustrating an example of a data process performed by the cache memory device;

FIG. 21D is a flowchart illustrating an example of a data process performed by the cache memory device.

DESCRIPTION OF EMBODIMENTS

As described previously, when the cache memory device requests data from a main storage device due to a cache miss and there is no free cache line in the cache memory device, even if the data of the cache line for eviction is present in the main storage device, the data and status of that cache line are read out, and the read out status is used for processing the data of that cache line. As a result, even when a cache line for eviction has the same data as the main storage device and the data of that cache line does not have to be evicted, a clock is supplied to the tag cache memory and data cache memory for reading out the status of the cache line. There is a unnecessary supply of a clock to the data cache memory after read out of the status of the cache line.

Figure 1:
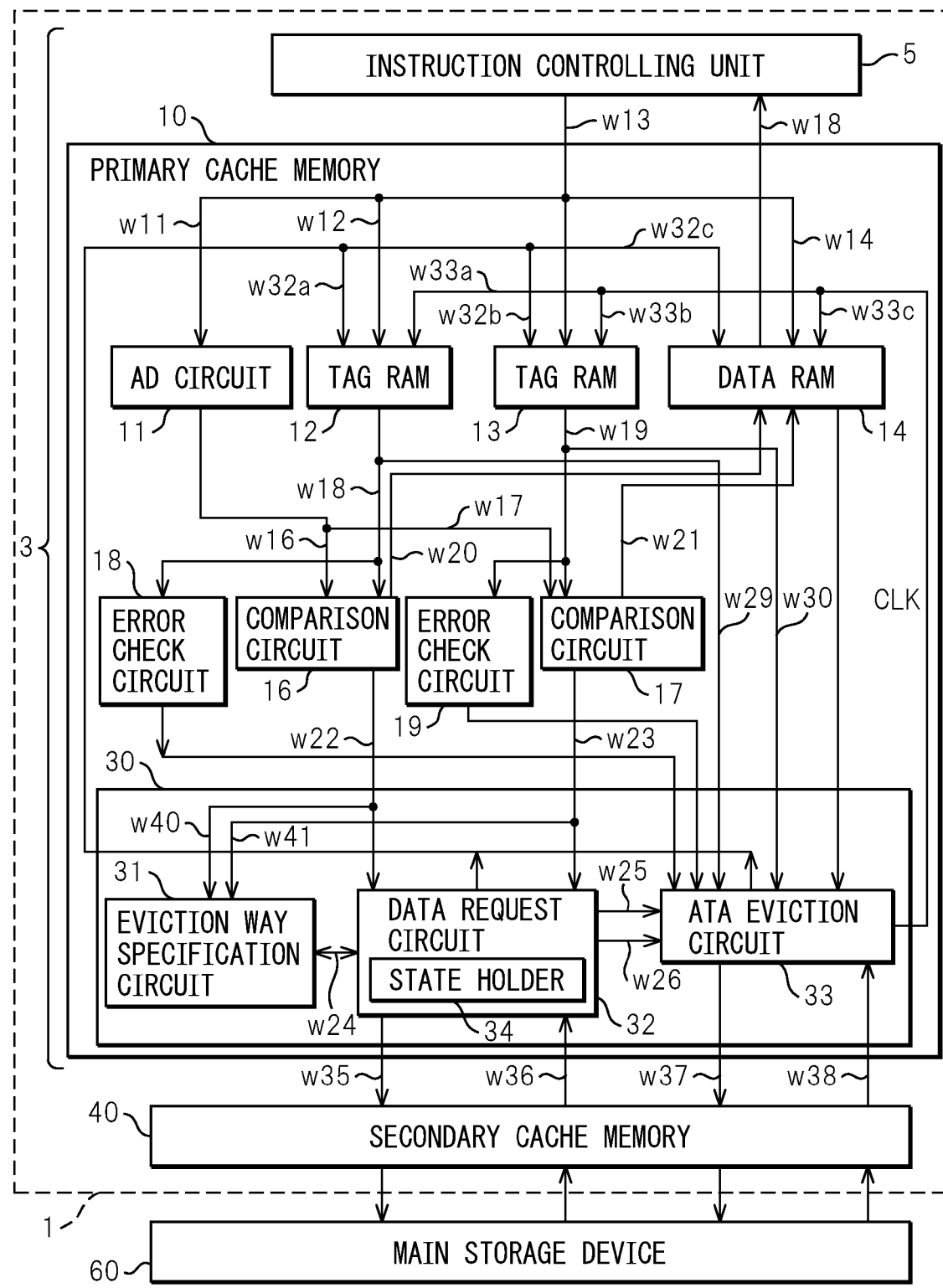
FIG. 1 is a block diagram illustrating an example of the configuration of a cache memory device.

Below, referring to the drawings, an embodiment of the cache memory device will be explained. FIG. 1 is a block diagram illustrating an example of the configuration of a processor including connected to a main memory device. The processor 1 includes an instruction controlling unit 5, a primary cache memory 10, and a secondary cache memory 40 and is connected to a main storage device 60. The cache memory device (primary (L1) cache memory) 10 illustrated in FIG. 1 has an address conversion circuit (AD circuit) 11, tag RAMs 12, 13, a data RAM 14, comparison circuits 16, 17, error check circuits 18, 19, and a data control circuit 30. The data control circuit 30 has an eviction way specification circuit 31, a data request circuit 32, and a data eviction circuit 33.

The primary cache memory 10 is connected with an instruction controlling unit 5 and a secondary (L2) cache memory 40 by wirings. The secondary cache memory 40 is connected to a main storage device 60 by wirings. The primary cache memory 10 is applied so as to cache part of the data stored in the secondary cache memory 40. The secondary cache memory 40 is applied so as to cache part of the data stored in the main storage device 60. Below, the secondary cache memory 40 and the main storage device 60 will be referred to as "lower level memories".

Note that, the instruction controlling unit 5 and the primary cache memory 10 or the instruction controlling unit 5, the primary cache memory 10, and the secondary cache memory 40 are included in the processor 1. In FIG. 1, the primary cache memory 10 may also be directly connected with the main storage device 60 instead of the secondary cache memory 40. Further, the tag RAM 12 and the data RAM 14 illustrated in FIG. 1 are illustrated as mutually separate RAMs, but may also be configured by a single cache RAM having a tag part and a data part. In this case, in the following explanation, the explanation relating to that tag RAM would correspond to the explanation of the tag part of the cache RAM, and the explanation relating to the data RAM would correspond to the explanation of the data part of the cache RAM. The primary cache memory 10 illustrated in FIG. 1 has two tag RAMs, but the primary cache memory 10 may also just have a single tag RAM. The explanation of the tag RAM 12 can also be applied to the tag RAM 13. Further, the instruction controlling unit 5 and the primary cache memory 10 are included in a processor core 3. In FIG. 1, only one processor core 3 is connected to the second cache memory 40, but a plurality of processor cores may also be connected to the second cache memory 40.

The instruction controlling unit 5 sends a memory access request including a memory access address to the address conversion circuit 11, the tag RAMs 12, 13, and the data RAM 14. The memory access address includes index addresses of the address conversion circuit 11, tag RAMs 12, 13, and a data RAM 14, respectively. The index address is used as a lower part address of the physical address for accessing the main storage device 60. A higher part address of the memory access address is used as "offset". The offset specifies a plurality of higher bits of a physical address of the main storage device 60. The memory access address further includes a "tag" specifying data of the target of the memory access besides the index address and the offset.

The tag RAMs 12, 13 are realized by SRAMs (Static Random Access Memories) that has a plurality of entries, for example. The tag RAMs 12, 13 are RAMs for storing the above tags. The tag RAMs 12, 13 receive memory access requests output from the instruction controlling unit 5 through respective signal lines w12 and w13. The tag RAMs 12, 13 receive clock signals CLK output from the data eviction circuit 33 through respective signal lines w33a and w33b. Further, the tag RAMs 12, 13 receive addresses and way selection information output from the data request circuit 32 or data eviction circuit 33 and access entries specified by the addresses and way selection information in synchronization with the clock.

The tag RAMs 12, 13 are RAMs storing tags and control information, respectively. Note that, the control information will be referred to as "states" or as "cache states" below. The states will be explained later using FIG. 4. The index addresses are used as addresses specifying lines of the tag RAMs 12, 13. The data RAM 14 stores data of part of the physical addresses of the main storage device 60. The tag RAMs 12, 13 clarify from which physical addresses of the main storage device 60 data stored in the data RAM 14 were obtained from by storing tags specifying the physical addresses of the main storage device 60 from which data stored in the data RAM 14 was obtained in the lines specified by the index addresses. Further, the tags and states of the tag RAMs 12, 13 and the data of the data RAM 14 are stored linked by the same index addresses. For this reason, by specifying an index address, the data of the data RAM and the physical addresses specified by the tags stored in the tag RAMs linked with the same index address are specified. Note that, a "tag" is just one part of a physical address specifying data in the main storage device 60, so with just a tag, data in the main storage device 60 is not unambiguously specified. For this reason, by comparing the output tags of the tag RAMs 12, 13 with an output tag of the address conversion circuit 11, it is judged if the data to be accessed is stored in the data RAM 14 or is to be obtained from a lower level memory.

Further, when data stored in the primary cache memory 10 is over written by a memory access from the instruction controlling unit 5, the primary cache memory 10 writes back the over written data in the main storage device 60. Furthermore, when a cache miss occurs in the primary cache memory 10 for a memory access from the instruction controlling unit 5 and there is no vacancy in the lines of the data RAM 14, the primary cache memory 10 evicts data held in an entry stored in the primary cache memory 10. For this reason, the tag RAMs 12, 13 store "states" illustrating the statuses of the data together with the tags. A detailed example of the tag RAMs 12, 13 will be explained later using FIG. 2. A detailed example of the states will be explained later using FIG. 4.

The data RAM 14 is realized by an SRAM, for example. The data RAM 14 is a RAM storing index addresses of the tag RAMs 12, 13 and data corresponding to the tags stored in the tag RAMs 12, 13. The index addresses are used as addresses for specifying lines of the data RAM 14. The data RAM 14 receives memory access requests output from the instruction controlling unit 5 through the signal line w14. Further, the data RAM 14 receives cache miss judgment signals output from the comparison circuits 16, 17 through the respective signal lines w20, w21. When a cache miss judgment signal indicates a "cache hit" illustrating that a tag output by the address conversion circuit 11 and a tag output by the tag RAM 12 match, the data RAM 14 supplies the data corresponding to the output tag of the tag RAM to the instruction controlling unit 5.

The data RAM 14 receives a clock signal CLK supplied from the data eviction circuit 33 through a signal line w33c. Further, the data RAM 14 receives addresses and way selection information output from the data request circuit 32 or data eviction circuit 33, and the data RAM 14 outputs data specified by the addresses and way selection information in synchronization with the clock. A detailed example of the data RAM 14 will be explained later using FIG. 5.

The address conversion circuit 11 is realized by a TLB (Translation Lookaside Buffer), for example. The address conversion circuit 11 is a circuit outputting a physical address covered by a memory access request specified by an index address. The address conversion circuit 11 outputs a tag unambiguously specifying a physical address of the main storage device 60. That is, the address conversion circuit 11 receives a memory access request output from the instruction controlling unit 5 through the signal line w11. After receiving the memory access request, the address conversion circuit 11 then outputs the physical address linked to the index address specified by the memory access request to the comparison circuits 16 and 17.

The comparison circuit 16 is a circuit which compares a tag output from the address conversion circuit 11 and a tag output from the tag RAM 12 and judges if the tag output from the address conversion circuit 11 and the tag output from the tag RAM 12 match. Specifically, the comparison circuit 16 receives a tag output from the address conversion circuit 11 through the signal line w16, receives a tag output from the tag RAM 12 through the signal line w18, and judges if the two received tags match. When the tag output from the address conversion circuit 11 and the tag output from the tag RAM 12 match, the comparison circuit 16 outputs a cache hit judgment signal illustrating that the two tags match through the signal line w20 to the data RAM 14. The comparison circuit 17 operates similarly to the comparison circuit 16. That is, when the tag output from the address conversion circuit 11 and a tag output from the tag RAM 13 match, the comparison circuit 17 outputs a cache hit judgment signal through the signal line w21 to the data RAM 14.

When the tag output from the address conversion circuit 11 and the tag output from the tag RAM 12 do not match, the comparison circuit 16 outputs a cache miss judgment signal indicating a miss of the tags through the output signal line w22 to the data request circuit 32. The comparison circuit 16 outputs the cache miss judgment signal and the tag output from the address conversion circuit 11, tag output from the tag RAM 12, and state to the data request circuit 32.

Note that, the tag RAMs 12, 13 may also be of the "n-way set associative type", as explained later using FIG. 2. The "n-way set associative type" means the system where tags held at a plurality of ways are selected for a single index address. In the case of the n-way set associative type, the comparison circuits 16, 17 compare a tag output from the address conversion circuit 11 and tags output from a plurality of ways specified by the same line. In this case, the comparison circuits 16, 17 have pluralities of comparison circuits provided for the different ways. These comparison circuits output tags and states to the data request circuit 32.

As explained above, the comparison circuit 16 compares the tags, then outputs a cache miss judgment signal, the tag output from the address conversion circuit 11, the tag output from the tag RAM 12, and a control signal through the signal line w22 to the data request circuit 32. The comparison circuit 17 compares the tags, then outputs a cache miss judgment signal, the tag output from the address conversion circuit 11, the tag output from the tag RAM 13, and a control signal through the signal line w23 to the data request circuit 32. Further, the comparison circuits 16, 17 output the index addresses and cache miss judgment signals through the respective signal lines w40 and w41 to the eviction way specification circuit 31, respectively. A detailed example of the comparison circuits 16, 17 will be explained using FIG. 2.

The error check circuits 18 and 19 are circuits receiving the tags output from the tag RAMs 12 and 13 and running error checks, respectively. The error checks are parity error checks or ECC (Error Check Correction), for example. When an error occurs, the error check circuits 18 and 19 output error signals to the data eviction circuit 33.

The eviction way specification circuit 31 is a circuit using index addresses and cache miss judgment signals to specify an eviction way for eviction in the plurality of ways of the primary cache memory 10. Specifically, the eviction way specification circuit 31 receives index addresses and cache miss judgment signals and specifies an eviction way. For example, as explained later with reference to FIG. 2, when the tag RAMs are 2-way set associative types, the tag RAM 12 or 13 outputs two cache miss judgment signals from two ways by a single index address. The eviction way specification circuit 31 receives the two cache miss judgment signals from the tag RAM 12 or 13 and specifies either of the two ways as an eviction way. The method of specifying the eviction way from a plurality of ways includes determination of the way with the smallest frequency of access, the way with not accessed for the longest time (LRU (Least Recently Used)

method), the type of state explained later, etc. The eviction way specification circuit 31 outputs a signal specifying the eviction way through the signal line w24 to the data request circuit 32.

In this way, the eviction way specification circuit 31 selects an eviction way using a cache miss judgment signal received from the tag RAM at which a cache miss occurred. For this reason, the primary cache memory 10 will not re-access the tag RAMs 12, 13 for specifying the eviction ways of the tag RAMs 12, 13. In this way, the primary cache memory 10 has fewer processing steps in eviction process compared with the case of accessing the tag RAMs again for specifying the eviction way, so it is possible to speed up a read operation and reduce operations in a cache miss.

The data request circuit 32 has a state holder 34. At the time of a cache miss, the state holder 34 holds the states, tags, and ways received from the comparison circuits 16, 17 and eviction way specification circuit 31.

Further, the data request circuit 32 obtains data of a physical address specified by the output tag of the address conversion circuit 11 and the index address from the lower level memory of the secondary cache memory 40 or through the secondary cache memory 40 from the main storage device 60.

The data request circuit 32 obtains from the comparison circuit 16 through the signal line w22 a cache miss judgment signal, a tag output from the address conversion circuit 11, a tag output by the tag RAM 12, and a control signal. Further, the data request circuit 32 obtains from the comparison circuit 17 through the signal line w23 a cache miss judgment signal, a tag output from the address conversion circuit 11, a tag output by the tag RAM 13, and a control signal.

When a cache miss judgment signal indicates a cache miss, the data request circuit 32 requests data of the physical address through the signal line w35 to the lower level memory of the secondary cache memory 40 and obtains data of the physical address through the signal line w36. The data request circuit 32 outputs the state held at the state holder 34 through the signal line w25 to the data eviction circuit 33.

Further, the data request circuit 32 supplies a clock to the tag RAMs 12, 13 and the data RAM 14 and registers the data concerned obtained from the secondary cache at the tag RAMs 12, 13 and the data RAM 14.

The data eviction circuit 33 performs an eviction process for the tag RAMs 12, 13 or data RAM 14 in accordance with the state received from the data request circuit 32. An embodiment of the eviction process will be explained later using FIG. 6 to FIG. 21.

Note that when the size of the data of the tag RAMs and/or the size of the data of the data RAM is large, the eviction process is sometimes divided into a plurality of flows. The data eviction circuit 33 obtains the state from the tag RAMs 12, 13 at the first flow. Specifically, the data eviction circuit 33 performs a plurality of flows such as a first flow in which the data eviction circuit 33 reads out the valid bit and state bit from the tag RAMs and a second flow in which the data eviction circuit 33 invalidates the valid bit of the tag RAM, for example, changes the valid bit from "1" to "0", and changes the state bit to "I". Note that, the tags of a tag RAM are read out in the first flow so that the tags to be evicted can be stored in a lower level memory.

Figure 2:
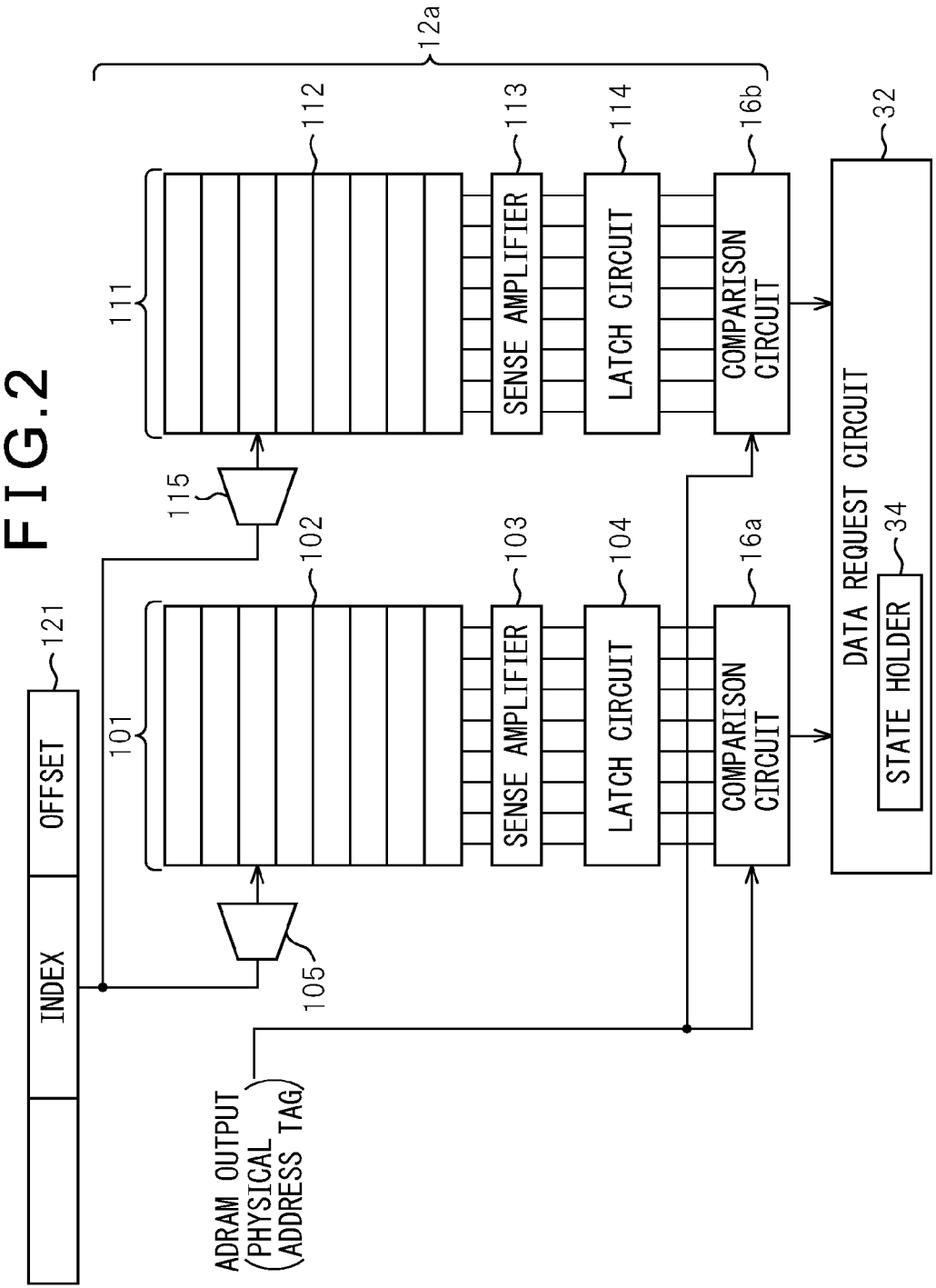
FIG. 2 is a block diagram illustrating a detailed example of a tag RAM and a comparison circuit.

FIG. 2 is a block diagram illustrating a detailed example of a tag RAM and a comparison circuit. The illustrated tag RAM 12a corresponds to the tag RAM 12 or 13 illustrated in FIG. 1. The illustrated comparison circuits 16a, 16b are provided for single ways of the tag RAM 12, respectively. The tag RAM 12a is a set associative type RAM. For this reason, the tag RAM 12a has a way 101 and a way 111. While not illustrated in FIG. 2, the tag RAM 12a may also have three or more ways. The way 101 has a memory cell array 102, a sense amplifier 103, a latch circuit 104, and a row decoder 105. The way 111 has a memory cell array 112, a sense amplifier 113, a latch circuit 114, and a row decoder 115.

The memory access address included in the memory access request output from the instruction controlling unit 5 is illustrated as a virtual address 121. The lower bits of the virtual address 121 indicate a page offset. Above the page offset of the virtual address 121, the index address is illustrated. The index address specifies lines of the memory cell arrays 102 and 112.

The lines of the memory cell arrays 102, 112 store tags specifying the physical addresses and states, respectively. The row decoders 105, 115 serving as tag search units decode the index addresses and output cache line selection signals for selecting cache lines of the memory cell array 102. The row decoders 105, 115 activate the cache lines selected by the cache line selection signals. The memory cells connected to the activated lines change the potentials of not illustrated column lines. The sense amplifiers 103, 114 amplify the potential changes of the column lines and generate signals so as to store data in the latch circuits 104, 114, respectively. The latch circuits 104, 114 store data for one cycle, then output the stored data to the comparison circuits 16a, 16b, respectively. By doing this, the tag RAM 12a outputs the tags specified by the index and the states to the comparison circuits 16a, 16b.

The comparison circuits 16a, 16b compare the tags read out from the latch circuits 104, 114 and a tag output from the address conversion circuit 11, respectively. The comparison circuits 16a, 16b supply cache hit signals, output tags from the address conversion circuit 11, and output tags and states from the memory cells arrays 102, 112 to the data request circuit 32, respectively. The states are held at the state holder 34.

Note that, while no detailed example of the address conversion circuit 11 is illustrated, the address conversion circuit 11 also may be a set associative type of RAM such as illustrated in FIG. 2. However, the tag RAMs 12, 13 store tags stored in the data RAM 14 and specifying physical addresses of part of the data stored in the main storage device 60, while the address conversion circuit 11 stores tags specifying all physical addresses of the main storage device 60. They differ on this point.

Figure 3:
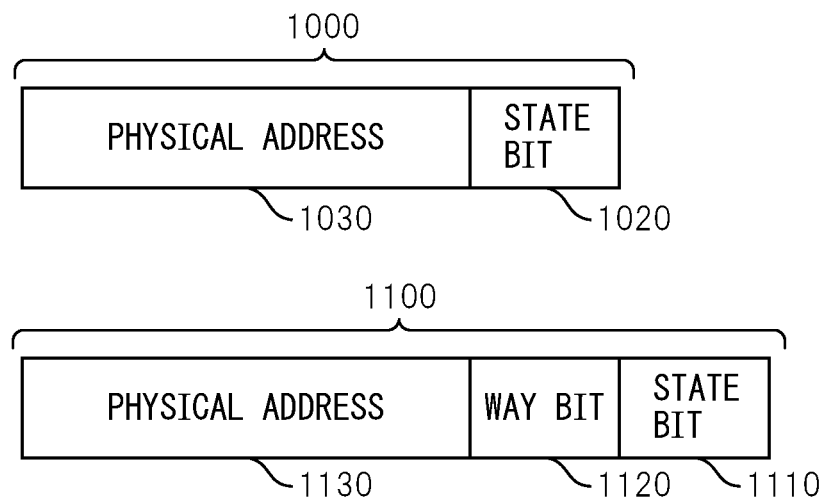
FIG. 3 is a data format illustrating an example of the format of data held in the tag RAM and the format of data held in a state holder.

FIG. 3 is a view illustrating an example of the structure of the data held in the tag RAMs and the structure of the data held in the state holder. The data structure 1000 illustrated in FIG. 3 is a data structure of data held in the tag RAMs 12, 13. The data structure 1000 includes a physical address 1030 and state bits 1020 specifying the state. The data structure 1100 is a data structure of data held in the state holder. The data structure 1100 includes a physical address 1130, way bits 1120 specifying a way for eviction, and state bits 1110 specifying the state.

Figure 4:
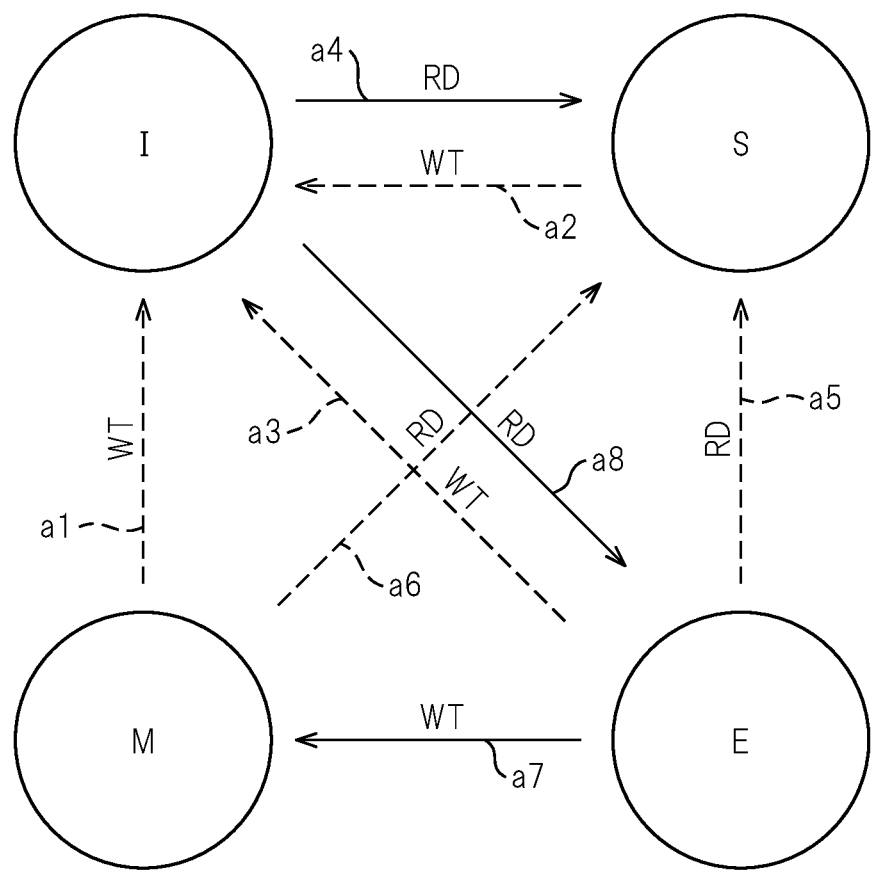
FIG. 4 is a state transition diagram for explaining the state of a line in a data RAM.

FIG. 4 is a state transition diagram for explaining an example of the states of a line of a data RAM. The states are stored together with the tags in the tag RAMs 12, 13, as explained above. As illustrated in FIG. 2, a line of the data RAM 14 will be in either one of four states based on the MESI protocol: "M (Modified)", "E (Exclusive)", "S (Share)", or "I (Invalidate)". The "WT (WriTe)" illustrated in FIG. 2 indicates a write operation, while the "RD (ReaD)" indicates a read operation. Note that, the example of the states is explained based on the MESI protocol, but the states able to be used in the present embodiment are not limited to the MESI protocol. A protocol where the "O (Own)" state is added such as the MOSI protocol or MOESI protocol is also possible.

"M" indicates that data is present only at the line of the data RAM 14 and that the data of the data RAM 14 has been changed from the data of the same physical address as the line of the data RAM 14 stored in the main storage device 60. "E" indicates the state where the data of a line of the data RAM 14 and the data of the same physical address as the line of the data RAM 14 stored in the main storage device 60 match, but there is no data matching with the primary cache memories of other processor cores different from the processor core 3. "S" indicates the state where the data of a line of the data RAM 14, the data of the same physical address as the line of the data RAM 14 stored in the main storage device 60, and the data of the same physical address as the line of the data RAM stored in the primary cache memories of other processor cores all match. "I" indicates that the line of the data RAM 14 is invalid.

In FIG. 4, the solid lines indicate memory access requests output from the instruction controlling unit 5, while the broken lines in FIG. 4 indicate memory access requests output from other instruction controlling units. The state transitional indicates the transition of the state of data of the data RAM 14 of the same physical address as data attempted to be written over by another instruction controlling unit in another cache memory from "M" to "I" due to the attempted write over. Further, the state transition a2 indicates the transition of the state of data of the data RAM 14 of the same physical address as data attempted to be written over by another instruction controlling unit in another cache memory from "S" to "I". Furthermore, the state transition a3 indicates the transition of the state of data of the data RAM 14 of the same physical address as data attempted to be written over by another instruction controlling unit in another cache memory from "E" to "I".

The state transition a4 indicates the transition of the state of data from "I" to "S" due to the instruction controlling unit 5 registering data on another cache memory in the data RAM 14. The state transition a5 indicates the transition of the state of data from "E" to "S" due to another instruction controlling unit requesting the data of the data RAM 14. The state transition a6 indicates the transition of the state of data read out from "M" to "S" due to another instruction controlling unit requesting the data of the data RAM 14.

The state a7 indicates the transition of the state of data written over at the data RAM 14 from "E" to "M" due to the instruction controlling unit 5 writing over the data of the data RAM 14. The state a8 indicates the transition of the state of data from "I" to "E" due to the instruction controlling unit 5 registering data not held by another cache memory in the data RAM 14.

Figure 5:
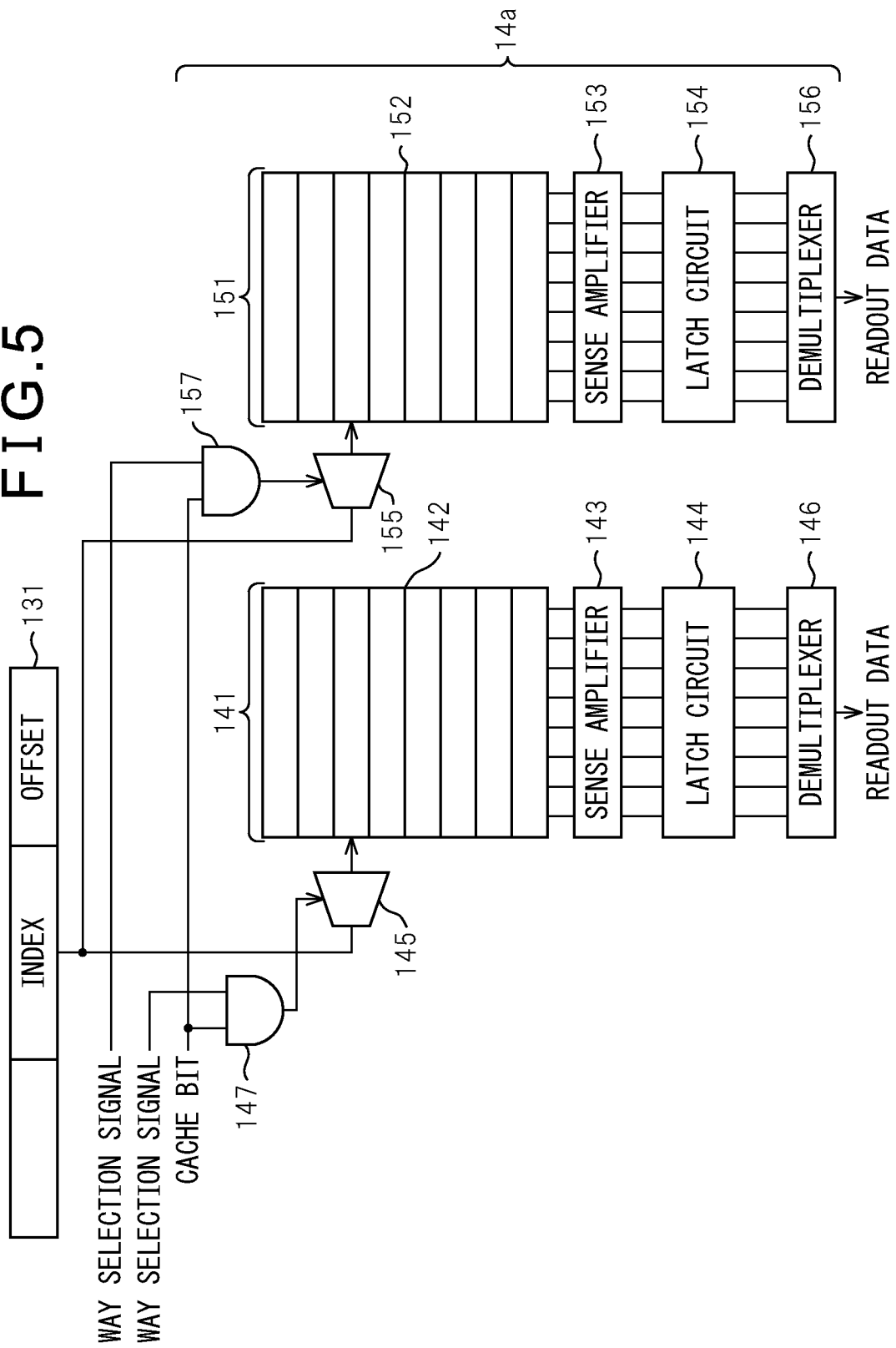
FIG. 5 is a block diagram illustrating a detailed example of a data RAM.

FIG. 5 is a block diagram illustrating a detailed example of a data RAM. The data RAM 14*a* of FIG. 5 corresponds to the data RAM 14 illustrated in FIG. 1. The data RAM 14*a* is an n-way set associative type of RAM. For this reason, the tag RAM 12*a* has a way 141 and a way 151. While not illustrated in FIG. 5, the data RAM 14*a* may also for example have three or more ways. The way 141 has a memory cell array 142, a sense amplifier 143, a latch circuit 144, a row decoder 145, a demultiplexer 146, and an AND circuit 147. The way 151 has a memory cell array 152, a sense amplifier 153, a latch circuit 154, a row decoder 155, a demultiplexer 156, and an AND circuit 157.

The ways of the data RAM 14*a* correspond to the ways of the tag RAMs 12, 13. The comparison circuits 16, 17 outputs way selection signals specifying the ways having cache hit tags to the data RAM 14*a*, respectively. By receiving an activated way selection signal, the data RAM 14*a* can specify a way of the data RAM 14*a* corresponding to a way having a cache hit address in the tag RAMs 12, 13.

The memory access address included in a memory access request output from the instruction controlling unit 5 is illustrated as a virtual address 131. The lower bits of the virtual address 121 indicate a page offset. In the virtual address 131, the index address is above the page offset. Index addresses specify lines of the memory cell arrays 142 and 152. The lines of the memory cell arrays 142 and 152 store data. The AND circuits 147, 157 receive index addresses of the virtual addresses 131 and cache hit signals and way selection signals output from the comparison circuits 16, 17, respectively.

By having a way selection signal specifying a way having a cache hit address received at either of the AND circuit 147 and AND circuit 157, the logic of either the AND circuit 147 or AND circuit 157 stands. The row decoder 145 or 155 decodes the index address and outputs a cache line selection signal when the output of the AND circuit 147 or 157 is active. The row decoder 145 or 155 activate the line of the memory cell arrays 142 and 152 specified by the cache line selection signal. In this way, the way of the data RAM 14*a* corresponding to a way of the tag RAM having a cache hit address is specified and the line of the memory cell array of the specified way is activated.

Memory cells connected to an activated line change the potential of a not illustrated column line. The corresponding sense amplifier 143 or 154 amplifies the potential change of the column line and generates a signal so as to store data in the latch circuit 144 or 154. The latch circuit 144 or 154 stores the data for exactly one cycle, then outputs the stored data to the demultiplexer 146 or 156. The demultiplexer 146 or 156 outputs the data read out from the latch circuit 144 to the instruction controlling unit 5.

Figure 6:
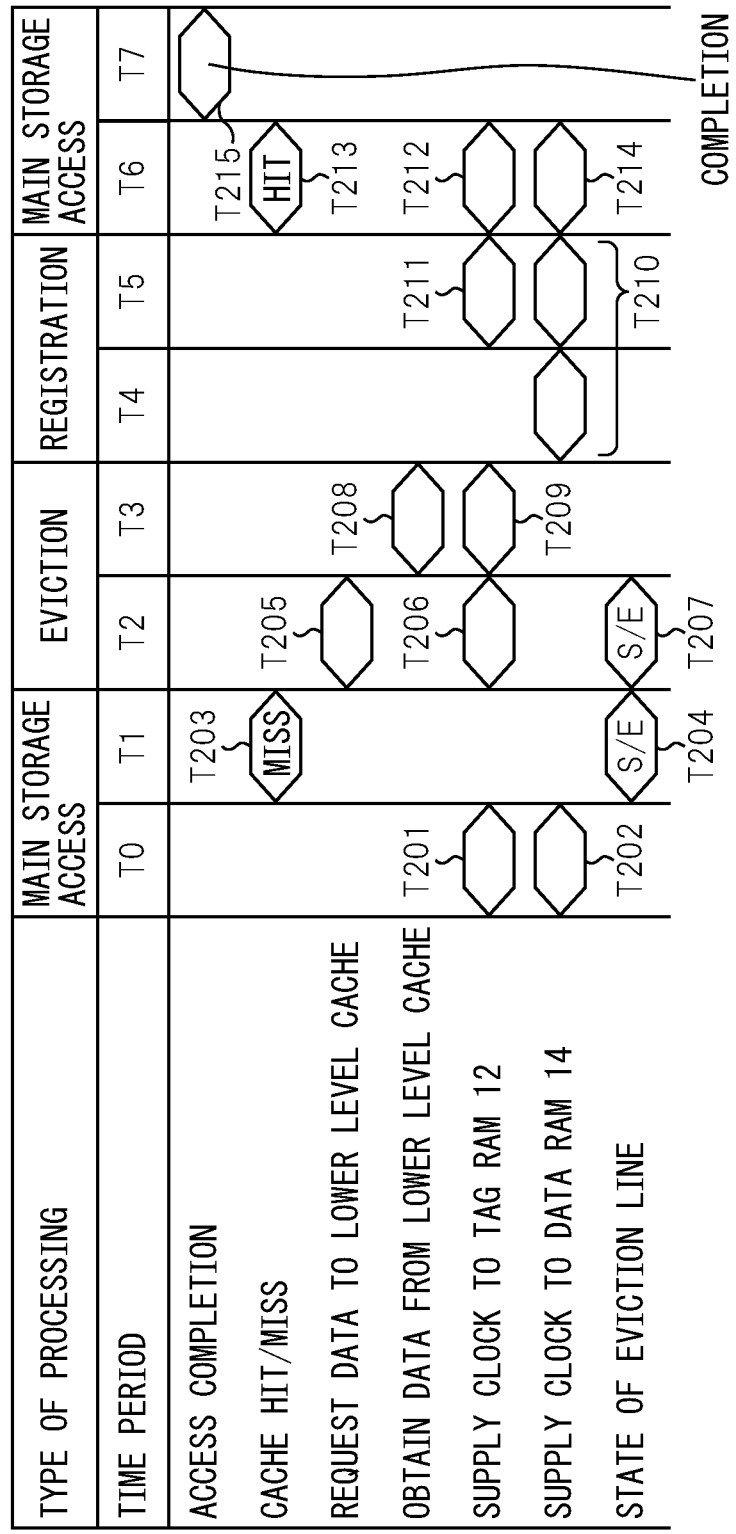
FIG. 6 is a time chart illustrating an example of an instruction controlling unit accessing data in a tag RAM and a data RAM.

FIG. 6 is a time chart illustrating one example of a time chart for when the instruction controlling unit accesses data of a tag RAM and the data RAM. In the time chart illustrated in FIG. 6, the instruction controlling unit 5 issues a data request to the primary cache memory 10, the primary cache memory 10 does not have the corresponding data, and therefore a cache miss occurs. Further, there is no vacancy in the lines of the primary cache memory 10, the primary cache memory 10 issues a data request to a lower level memory, and an entry stored in the primary cache memory 10 is evicted. In the example illustrated in FIG. 6, the eviction process is divided into two flows. In the first flow, in the eviction process of a tag RAM, the valid bit and state bits stored as a tag are read out. In the second flow, the valid bit of the tag RAM is invalidated.

In the time chart illustrated in FIG. 6, after a cache miss at the time period T1, the state of the read data is "S" or "E", so the primary cache memory 10 does not have to store the data stored in the data RAM 14 at a lower level memory. For this reason, the primary cache memory 10 does not evict the read data from the data RAM 14 in FIG. 6. It invalidates the valid bit and the state bits from the tag RAM and writes the read data read from the lower level memory to the tag RAM and the data RAM.

The time periods T0 and T1 indicate memory access operations by the instruction controlling unit 5. At the time period T0, the tag RAM 12 and the data RAM 14 receive a memory access request from the instruction controlling unit 5. As illustrated by T201 and T202, the tag RAM 12 and the data RAM 14 are supplied with a clock.

At the time period T1, the comparison circuit 16 outputs a cache miss judgment signal to the data request circuit 32 due to the cache miss illustrated at T203. The eviction way specification circuit 31 specifies a line illustrated by a tag output from at least one way among the tags received by the comparison circuit 16 as an eviction line. The state of the eviction line held by the data request circuit 32 at the state holder 34, as illustrated at T204, is "S" or "E".

The time periods T2 and T3 indicate the operation for eviction process by the primary cache memory 10. At the time period T2, as illustrated at T205, the data request circuit 32 requests the data covered by the memory access request from a lower level memory. The state of the eviction line read out from the state holder 34 at the time period T1 one cycle before the time period T2, as illustrated at T204, is "S" or "E". The state "S" or "E" indicates that the data of the eviction line matches the data stored in the main storage device, not the modified data, so the data eviction circuit 33 does not have to evict the data of the eviction line from the data RAM 14 and store it in the main storage unit 60. Therefore, the data eviction circuit can stop the supply of a clock to the data RAM 14 at the time period T2 and thereby reduce the power consumption. At the time period T2, as illustrated at T206, the data request circuit 32 specifies the address of the eviction line, and the data eviction circuit 33 supplies a clock to the tag RAM 12. At T206, as the first flow of the eviction process of the tag RAM, the valid bit and the state bits stored as the tag are read out. The read out state, as illustrated in T207, is "S" or "E". At the time period T3, the data request circuit 32, as illustrated at T208, obtains the data from the lower level memory. The state of the eviction line read out from the state holder 34 at the time period T2 one cycle before the time period T3, as illustrated at T207, is "S" or "E", so, at the time period T3, the data eviction circuit 33 does not supply a clock to the data RAM 14. Since the state of the eviction line illustrated at T207 is "S" or "E", as illustrated in T209, the data request circuit 32 specifies the address of the eviction line and the data eviction circuit 33 supplies a clock to the tag RAM 12. At T209, in the second flow of the eviction process of the tag RAM, the valid bit of the tag RAM 12 is invalidated by for example changing it from "1" to "0".

At the time periods T4 and T5, data is registered to the data RAM 14. At T210, the data request circuit 32 activates the way and the address signal of the eviction line of the data RAM 14, supplies a clock to the data RAM 14, and registers the data obtained from the lower level memory or the main storage device at the data RAM 14. Further, at the time period T5, at T211, by supplying a clock to the tag RAM 12, the data request circuit 32 registers the tag of the data obtained from the lower level memory or main storage device in the tag RAM 12.

The time periods T6 and T7 indicates the memory access operation of the instruction controlling unit 5. At the time period T6, the tag RAM 12 is supplied with a clock. The data RAM 14 stores the data to be accessed obtained from the lower level memory, so, as illustrated in T213, a cache hit occurs. At T214, the data RAM 14 receiving the cache hit judgment signal outputs the data corresponding to the physical address output from the tag RAM 12 to the instruction controlling unit 5. At the time period T7, as illustrated in T215, the memory access operation by the instruction controlling unit 5 ends.

In this way, after a cache miss has occurred, the storage device starts the eviction for an eviction line selected from tags judged as a cache miss. When the data of the eviction line is present at a lower level memory, the data of the eviction line is not written back to the lower level memory. The primary cache memory 10 can judge the state and quickly start the eviction. It does not start an unnecessary process of writing back data to the main storage device. By stopping the supply a clock to the data RAM 14 and stopping write back of data from the data RAM 14 to the main storage device, it is possible to suppress power consumption of the primary cache memory 10.

Figure 7:
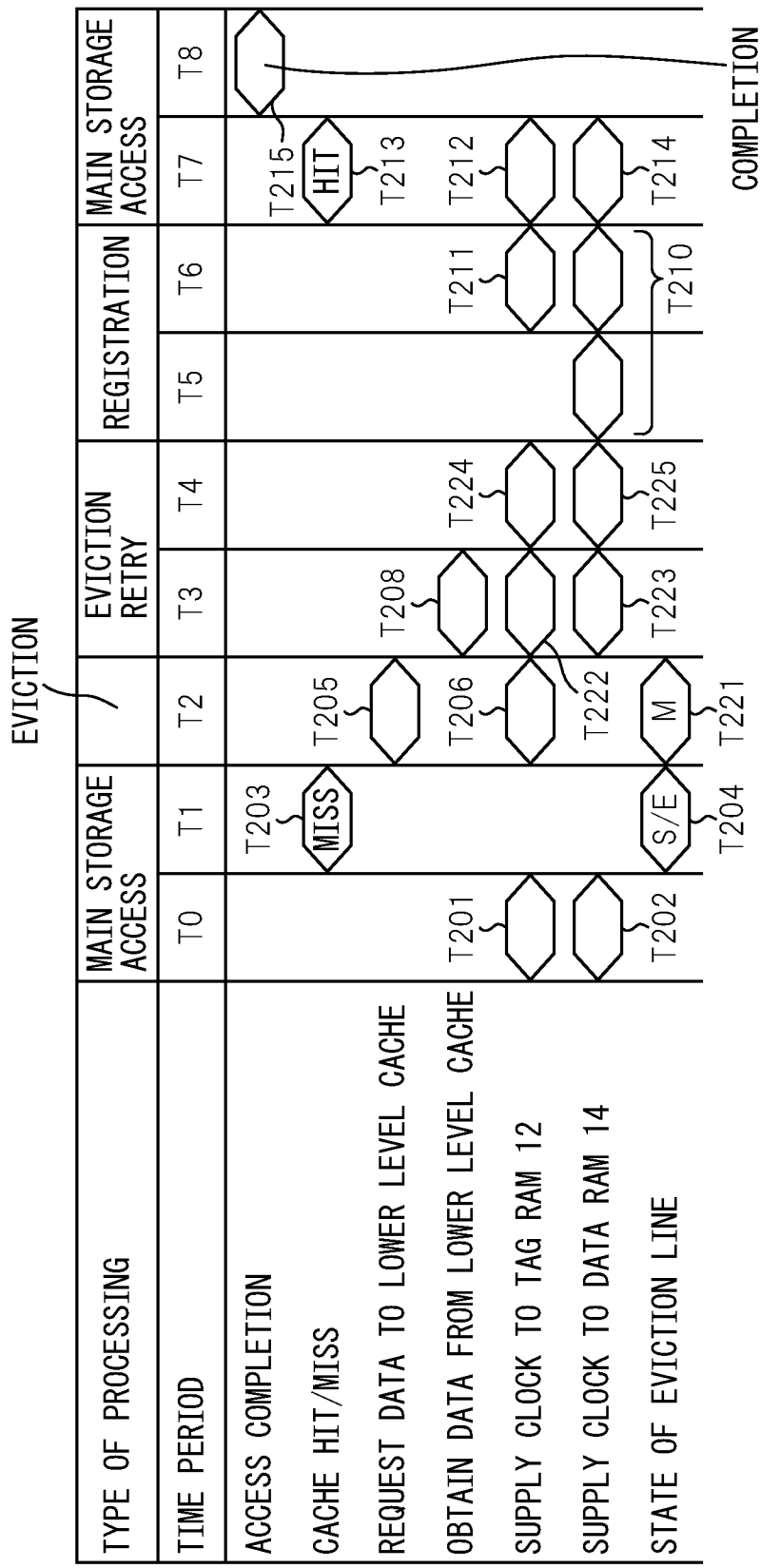
FIG. 7 is a time chart illustrating an example of an instruction controlling unit accessing data in a tag RAM and a data RAM.

FIG. 7 is a time chart illustrating an example of a memory access operation on a tag RAM and the data RAM. FIG. 7 indicates the case where when obtaining data from a lower level memory after a cache miss, the state of the eviction line is "M", so the data of the eviction line is evicted and written back into the main storage device 60. Note that, T201 to T206, T208, and T210 to T215 illustrated in FIG. 7 are the same as T201 to T206, T208, and T210 to T215 illustrated in FIG. 6, so explanations are omitted.

The state of the eviction line read out from the state holder 34 at the time period T1 one cycle before the time period T2, as depicted in T204, is "S" or "E". Therefore, at the time period T2, in the same way as the time period T1, the data eviction circuit 33 does not supply a clock to the data RAM 14. The data eviction circuit 33, as illustrated in T221, obtains the state "M" of the eviction line of the tag RAM 12. As illustrated in T204 and T221, the state of the eviction line changes from "S/E" to "M" during the first flow of the eviction process of the tag RAM 12. At the time period T3, the state of the eviction line identified by the data eviction circuit 33 at the time period T2 one cycle before the time period T3, as illustrated in T221, is "M". Therefore, the data eviction circuit 33 supplies a clock to the data RAM 14 in the time period T3 as illustrated at T222. The data eviction circuit 33 supplies a clock to the tag RAM 12 and reads out the valid bit and state bit stored as the tag at the tag RAM 12. At T223 and T225, the data eviction circuit 33 supplies a clock to the data RAM 14 to evict data for write back to the lower level memory secondary cache memory 40 or through the secondary cache memory to the main storage device 60. At T224, as a second flow of the eviction process of the tag RAM, the data eviction circuit 33 supplies a clock to the tag RAM 12 to invalidate the valid bit of the tag RAM.

After a cache miss has occurred, the primary cache memory 10 starts to evict an eviction line selected from tags judged as cache miss. When the state of a monitored eviction line changes to "M" in the middle of the eviction, the primary cache memory writes back the data of the tag RAM and the data RAM into a lower level memory. For this reason, the primary cache memory 10 can judge the state and quickly start the eviction process. Even when the state changes to "M" in the middle, it can respond quickly. Further, the data eviction circuit 33 stops the supply of the clock to the data RAM 14 until the middle of the eviction, so it is possible to suppress the power consumption of the primary cache memory 10.

Figure 8:
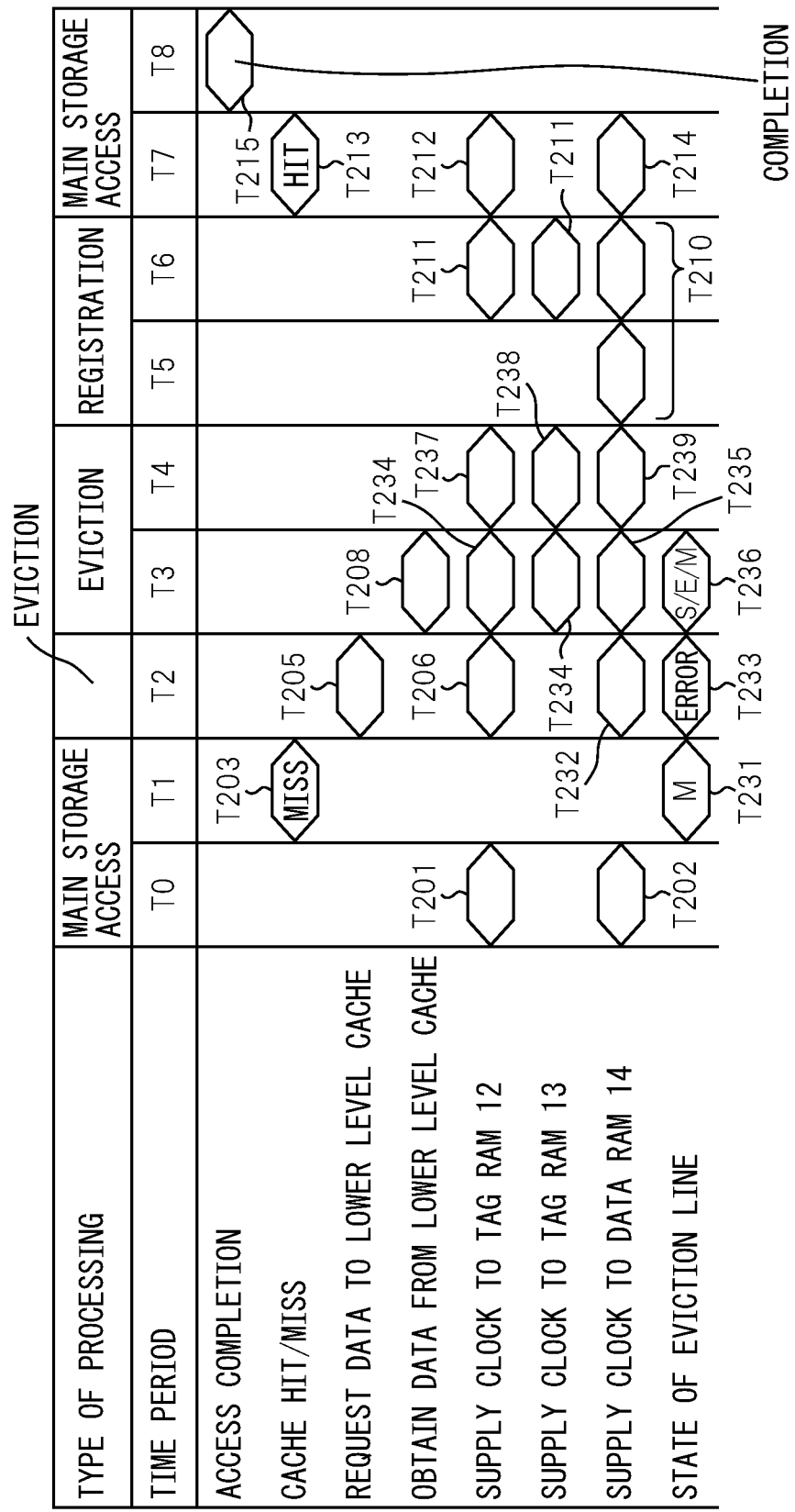
FIG. 8 is a time chart illustrating an example of an instruction controlling unit accessing data in a tag RAM and a data RAM.

FIG. 8 is a time chart illustrating an example of a memory access operation on the tag RAMs and the data RAM. FIG. 8 indicates the case where when obtaining data from a lower level memory after a cache miss has occurred, an error occurs during the read operation of the eviction line of the tag RAM 12, so the data of an eviction line of either of the tag RAMs 12 and 13 is evicted. Note that, T201 to T206, T208, and T210 to T215 illustrated in FIG. 8 are the same as T201 to T206, T208, and T210 to T215 illustrated in FIG. 6, so explanations will be omitted.

The state of the eviction line read out from the state holder 34 at the time period T1 one cycle before the time period T2, as depicted in T231, is "M". Therefore, as illustrated at T232, the data eviction circuit 33 supplies a clock to the data RAM 14 in the time period T2 so as to write back data to the lower level memory.

At T233, looking at the state of the eviction line, the case is illustrated where an error occurs in the read operation of a tag RAM during the first flow of the eviction process from the tag RAM. The eviction way specification circuit 31 does not continue the eviction of the eviction line where the error has occurred. At T234, as retry process, the data eviction circuit 33 performs the first flow again on the tag RAMs 12 and 13 to read out the valid bit and the state bits stored as the tags. At T235, the data eviction circuit 33 evicts a line of the data RAM 14 corresponding to tags of eviction lines of the tag RAMs 12 and 13.

At T236, the data eviction circuit 33 obtains the states of the eviction lines of the tag RAMs 12 and 13. When error occurs in only one tag RAM, the readout information of the tag RAM where no error occurs is used, while when error occurs in both tag RAMs, the eviction is proceeded with treating the state as "M".

At T237, in the second flow of the eviction process of the tag RAMs, the valid bit of the tag RAM 12 is invalidated. At T238, in the second flow of the eviction process of the tag RAMs, the valid bit of the tag RAM 13 is invalidated. At T239, the data eviction circuit 33 evicts the line of the data RAM 14 corresponding to the tag of the eviction line of the tag RAM 13.

In this way, the primary cache memory 10 starts to evict or to purge data from the data RAM immediately after obtaining data from the lower level memory when the state of the eviction line where the cache miss occurred is "M". For this reason, the primary cache memory 10 exhibits the advantageous effect of ending the eviction in a short time during reading of data from a lower level due to a cache miss. Further, when an error occurs in a tag RAM, the data eviction circuit uses the other tag RAM to execute the eviction process, so it is possible to prevent a delay in the eviction process due to error.

Figure 9:
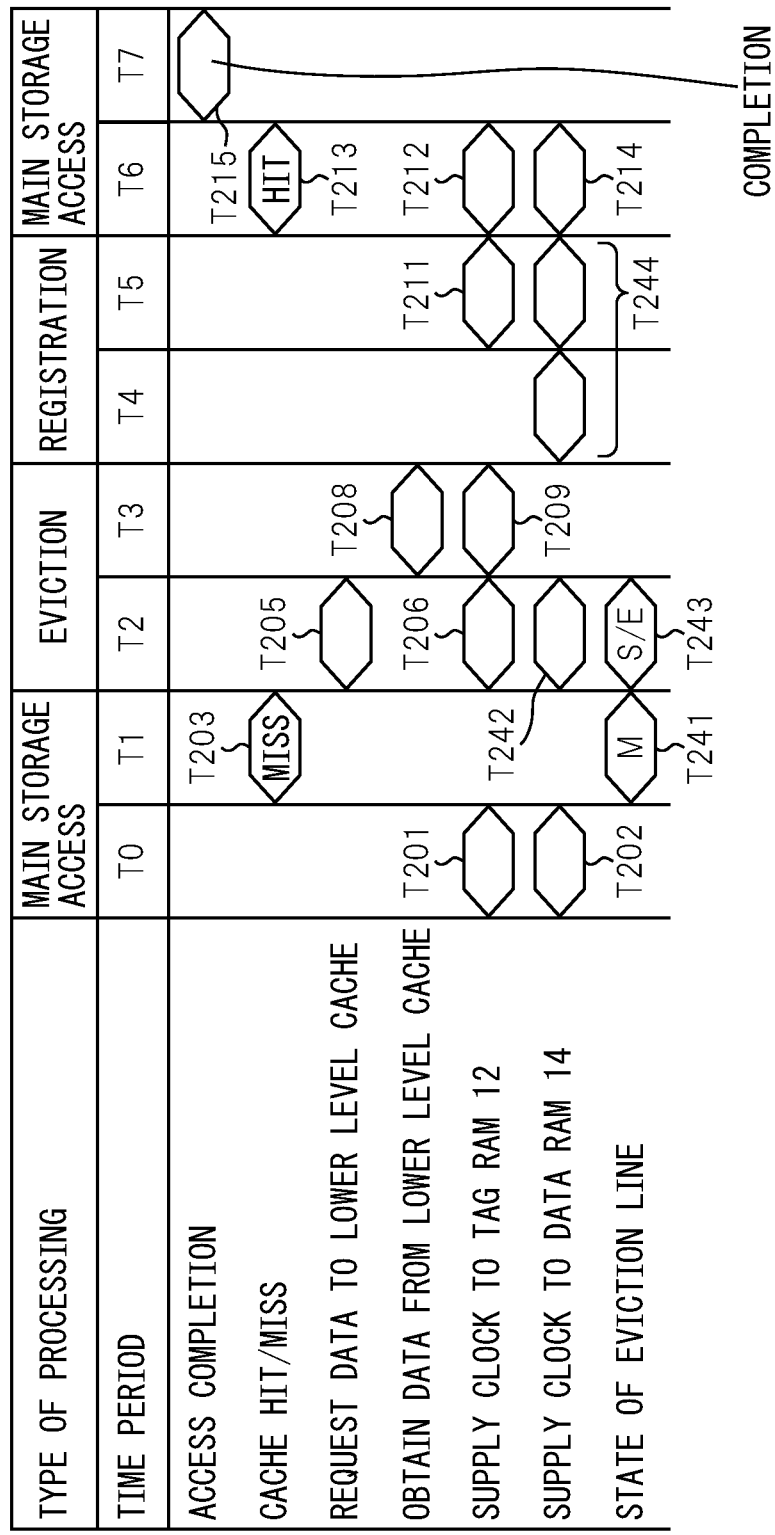
FIG. 9 is a time chart illustrating an example of an instruction controlling unit accessing data in a tag RAM and a data RAM.

FIG. 9 is a time chart illustrating an example of a memory access operation on a tag RAM and the data RAM. FIG. 9 indicates the case of starting eviction of data of an eviction line when obtaining data from a lower level memory after a cache miss since the state of the eviction line is "M" and suspending the eviction process when the state changes to "S/E". Note that, T201 to T203, T205, T208, and T210 to T215 illustrated in FIG. 9 are the same as T201 to T203, T205, T208, and T210 to T215 illustrated in FIG. 6, so explanations will be omitted.

At T241, the state of the eviction line read from the tags judged as cache miss is "M". Therefore, the data eviction circuit 33 supplies a clock to the data RAM 14 as illustrated at T242 to perform a write back process to a lower level memory. At T243, the state of the eviction line changes from "M" to "S/E" during the first flow of the eviction process from the tag RAM, so the eviction way specification circuit 31 stops the supply of the clock to the data RAM 14 at the time period T3.

As explained above, the primary cache memory 10 starts to evict or to purge the data from the data RAM immediately after obtaining data from a lower level memory when the state of the eviction line of data when a cache miss occurs is "M". However, when the state is changed to "S/E", write back of the data of the eviction line to the lower level memory becomes unnecessary, so the eviction process of the data RAM is stopped. Accordingly, the primary cache memory 10 can judge the state does not start an unnecessary write back process to the main storage device and also does not supply a clock.

Figure 10:
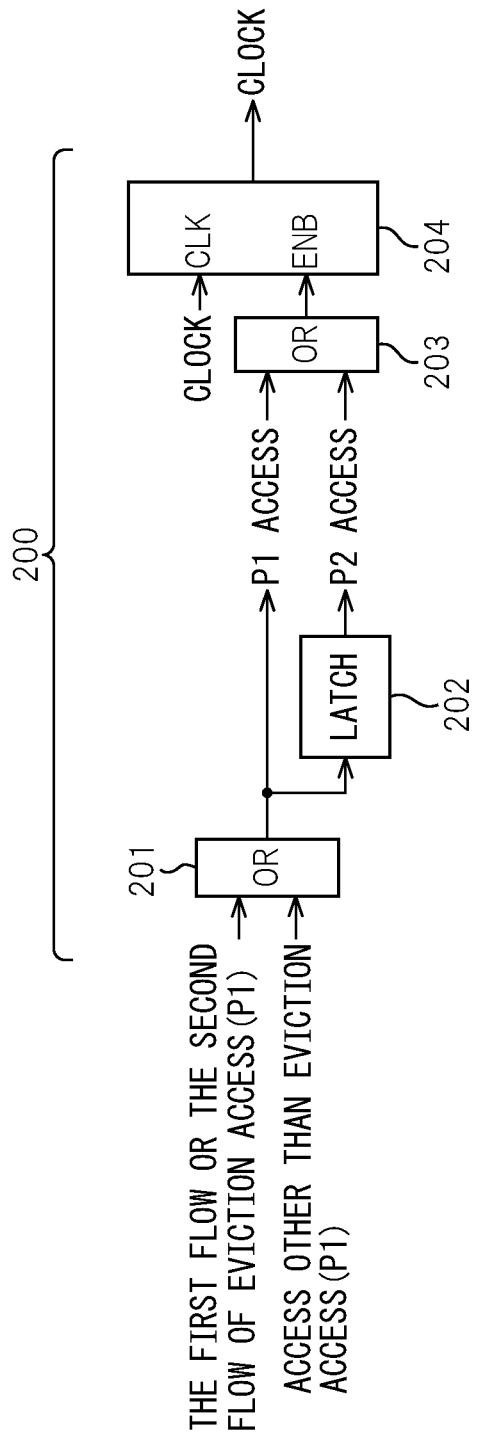
FIG. 10 is a block diagram illustrating a detailed example of a tag RAM clock control circuit.

The data eviction circuit 33 has tag RAM using clock control circuits 200, 400 and a data RAM using a clock control circuit 300. FIG. 10 is a block diagram illustrating a detailed example of the tag RAM using a clock control circuit.

The clock control circuit 200 for the tag RAM illustrated in FIG. 10 is a circuit for controlling the clock supplied to the tag RAM 12. The tag RAM clock control circuit 200 operates to supply a clock to the tag RAM 12 when the data eviction circuit 33 starts the eviction access for the tag RAM 12.

The tag RAM clock control circuit 200 has an OR circuit 201, latch circuit 202, OR circuit 203, and clock output circuit 204. The OR circuit 201 outputs a signal to the OR circuit 203 and latch circuit 202 when receiving an eviction access request from the control part of the data eviction circuit 33. The latch circuit 202 latches one cycle's worth of the output of the OR circuit 201. The OR circuit 203 receives a signal from the OR circuit 201 at the time P1 or a signal from the latch circuit 202 at the time P2, so outputs an enable signal to the clock output circuit 204 over a two-clock cycle. The clock output circuit 204 receives the signal from the OR circuit 203 as an enable signal and synchronizes with the clock so as to supply a clock to the tag RAM 12 over the P2 and P3 cycles of the pipeline.

Figure 11:
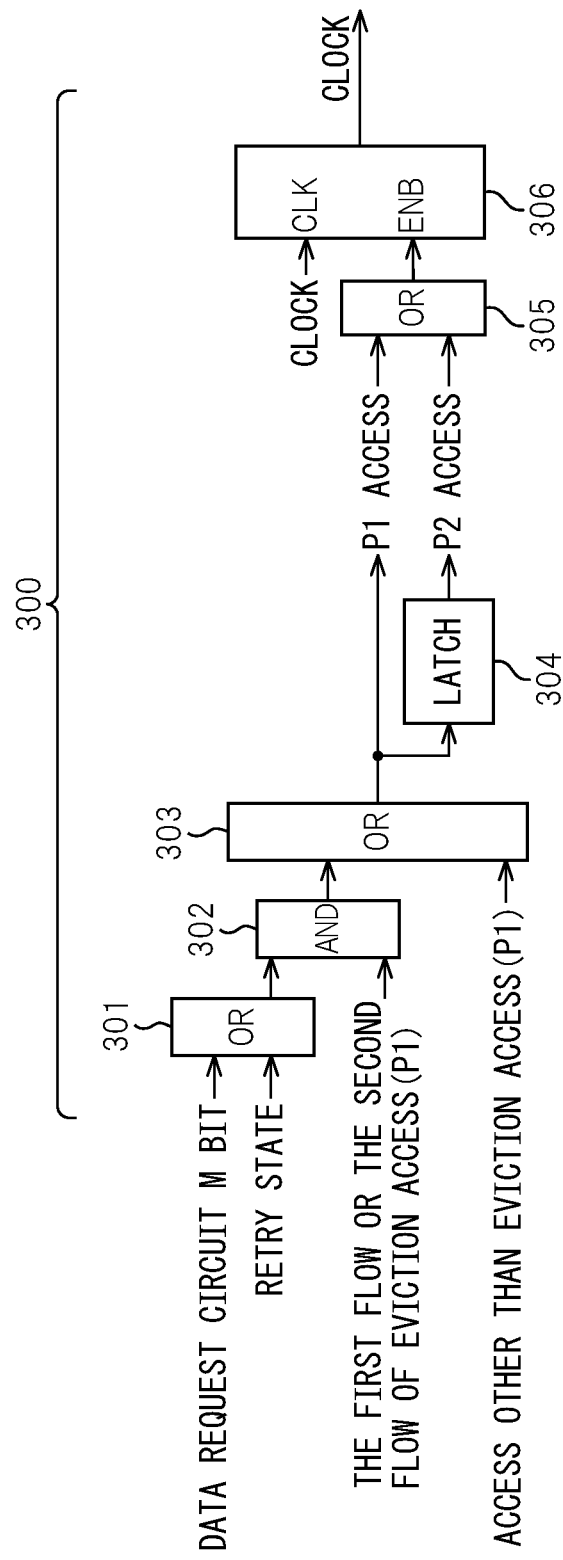
FIG. 11 is a block diagram illustrating a detailed example of a data RAM clock control circuit.

FIG. 11 is a block diagram illustrating a detailed example of a data RAM clock control circuit. The data RAM clock control circuit 300 illustrated in FIG. 11 is a circuit for controlling the clock supplied to the data RAM 14. When the data RAM clock control circuit 300 receives an eviction access request from the control part of the data eviction circuit 33 and the state of the eviction line is "M" or when it receives a registration request, the clock control circuit 300 supplies a clock to the data RAM 14. The data RAM clock control circuit 300 has OR circuits 301, 303, 305, an AND circuit 302, latch circuit 304, and clock output circuit 306. The latch circuit 304, OR circuit 305, and clock output circuit 306 correspond to the latch circuit 202, OR circuit 201, and clock output circuit 204, so explanations will be omitted.

When the OR circuit 301 receives the state of the eviction line "M" or retry state from the data request circuit 32, it outputs a signal to the AND circuit 302. So long as the OR circuit 301 does not output any signal, the data RAM clock control circuit 300 will not output a clock. Only when the state of the eviction line is "M" will the data RAM clock control circuit 300 operate to output a clock. When the AND circuit 302 receives an eviction access request from the control part of the data eviction circuit 33 and receives the signal from the OR circuit 301, the AND circuit 302 outputs a signal to the OR circuit 303. When the OR circuit 303 receives a signal from the AND circuit 302 or receives a registration access request or other access request other than an eviction access request from the control part of the data eviction circuit 33, it outputs a signal to the OR circuit 305 and latch circuit 304. The latch circuit 304 holds one-cycle's worth of the output of the OR circuit 303. The OR circuit 305 receives a signal from the OR circuit 303 at the time P1 or receives a signal of the latch circuit 304 at the time P2, so outputs a signal to the clock output circuit 306 over a two-clock cycle. The clock output circuit 306 receives the signal from the OR circuit 303 as an enable signal and synchronizes with the clock to thereby supply a clock to the tag RAM 12 across the P2 and P3 cycles of the pipeline.

Figure 12:
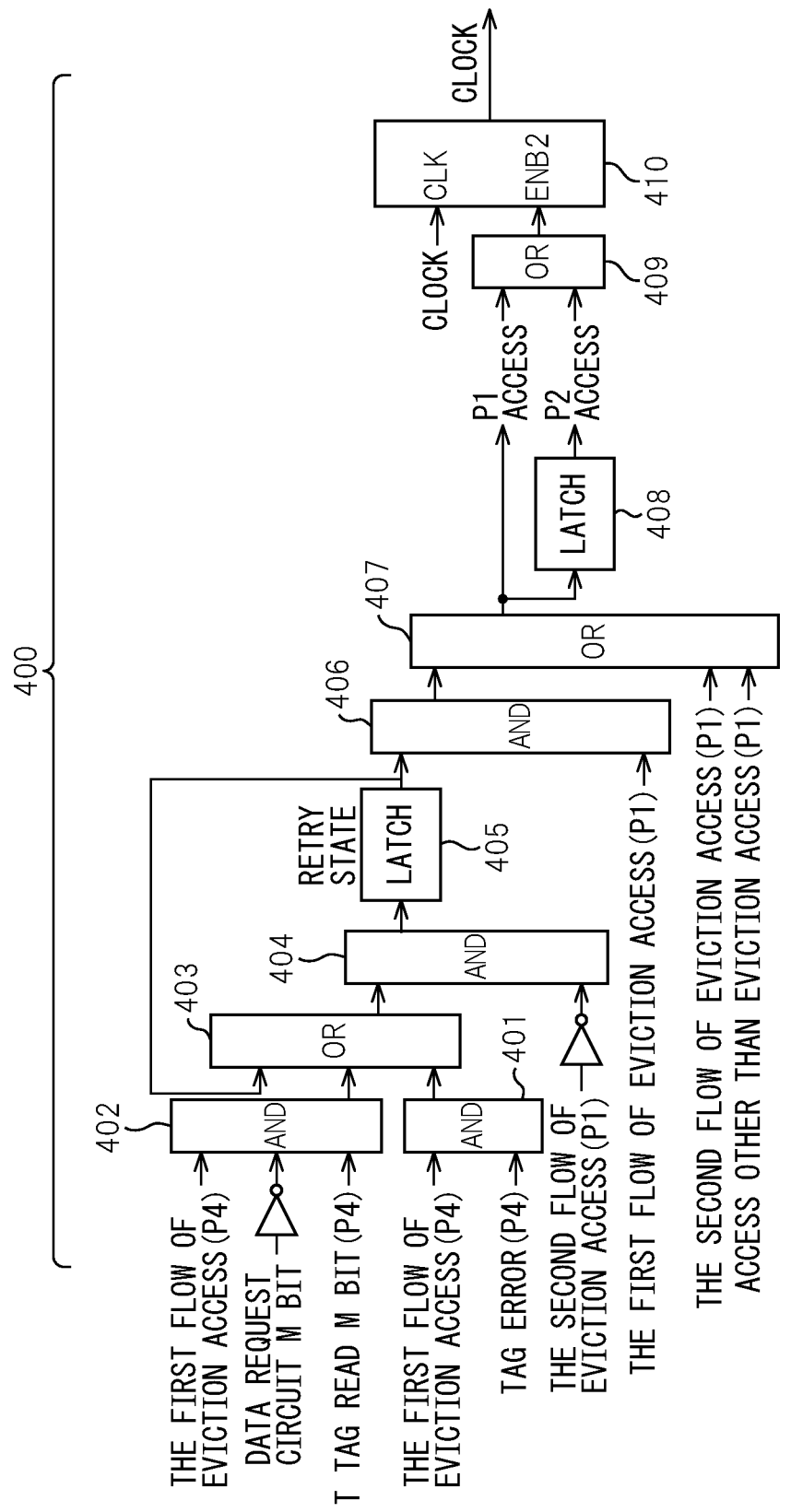
FIG. 12 is a block diagram illustrating a detailed example of a tag RAM clock control circuit.

FIG. 12 is a view illustrating a detailed example of a tag RAM clock control circuit. The tag RAM clock control circuit 400 illustrated in FIG. 12 is a circuit supplying a clock to the tag RAM 13. As explained above, the tag RAM 13 is supplied with a clock for establishing an eviction line when a read error of the tag occurs. For this reason, the tag RAM clock control circuit 400 operates when receiving a tag error signal such as illustrated at the AND circuit 401. Further, the tag RAM clock control circuit 400 operates when the state of the read out tag in the eviction process is "M" as illustrated in the AND circuit 402.

The tag RAM clock control circuit 400 has AND circuits 401, 402, 404, 406, OR circuits 403, 407, 409, a latch circuit 408, and a clock output circuit 410. The tag RAM clock control circuit 400 is a circuit supplying a clock to the RAM 13 when the state read out from the eviction line is not "M", a tag error signal is input, and there is an eviction access request of the first flow.

The AND circuit 401 operates to output a signal when it detects a tag error by the tag error signal in the eviction. The AND circuit 401 outputs a signal to the OR circuit 403 when receiving an eviction access request and tag error signal from the control part of the data eviction circuit 33. The AND circuit 402 outputs a signal when the state read out from the eviction line in the eviction process is "M". The AND circuit 402 outputs a signal to the OR circuit 403 when receiving an eviction access request from the control part of the data eviction circuit 33, the M state is read out in the first flow of the eviction process, and the state held in the data request circuit is not "M". The OR circuit 403 outputs a signal to the AND circuit 404 when receiving the retry state, the signal from the AND circuit 401, and the signal from the AND circuit 402.

The AND circuit 404 operates so as not to output a signal in the second flow of the eviction access. When receiving an inverted signal of the eviction access request of the second flow and the output of the OR circuit 403, it outputs a signal to the latch circuit 405. The latch circuit 405 holds the retry state until the AND circuit 404 receives a signal of the second flow of the eviction access request. The AND circuit 406 is a circuit outputting a signal when receiving a retry state and eviction access request. The OR circuit 407 outputs a signal when receiving any one of an access request other than an eviction access request from the control part of the data eviction circuit 33, an eviction access request of the second flow, or a signal of the AND circuit 406. The latch circuit 408 holds one cycle's worth of the output of the OR circuit 303 so as to supply a clock not only in the time P2 of the pipeline, but also the time P3 of the pipeline. The OR circuit 409 receives a signal from the OR circuit 40 at the time P1 or a signal from the latch circuit 202 at the time P2, so outputs a signal to the clock output circuit 410 over a two-clock cycle. The clock output circuit 410 receives the signal from the OR circuit 409 as an enable signal and synchronizes with the clock so as to supply a clock to the tag RAM 13 over the P2 and P3 cycles of the pipeline.

FIG. 13 is a time chart illustrating an example of a memory access operation in the case of a cache miss has occurred. At T301, the OR circuit 201 operates due to an eviction access request and an access request other than an eviction access request, so the tag RAM clock control circuit 200 supplies a clock to the tag RAM 12. At T305, the tag RAM clock control circuit 200 supplies a clock to the tag RAM 12 using the signal held by the latch circuit 202.

At T302, the OR circuit 407 operates due to an eviction access request and an access request other than an eviction access request, so the tag RAM clock control circuit 400 supplies a clock to the tag RAM 13. At T306, the tag RAM clock control circuit 400 supplies a clock to the tag RAM 13 using the signal held by the latch circuit 408. At T303, the OR circuit 303 operates by an access request other than an eviction access request, then the data RAM clock control circuit 300 supplies a clock to the data RAM 14. At T307, the latch circuit 304 holds the signal and thereby the data RAM clock control circuit 300 supplies a clock to the data RAM 14. At T308, as a result of the supply of a clock to the tag RAMs 12, 13 and the data RAM 14, the tags or data are read out. At T304, due to the readout of the tags, a cache miss occurs. At T309, due to the cache miss, the data request circuit 32 requests data from a lower level memory.

FIG. 14 is a time chart illustrating an example of a data access operation in the case of a cache hit. T311 to T313 and T315 to T318 illustrated in FIG. 14 correspond to the T301 to T313 and T315 to T308 illustrated in FIG. 13 respectively, so explanations will be omitted. At T319, due to a cache hit, the data stored in the data RAM 14 is used without having to read it out from a lower level memory, so that data is sent over the pipeline P4 to the instruction controlling unit 5. At T320, the access is ended.

Figure 15:
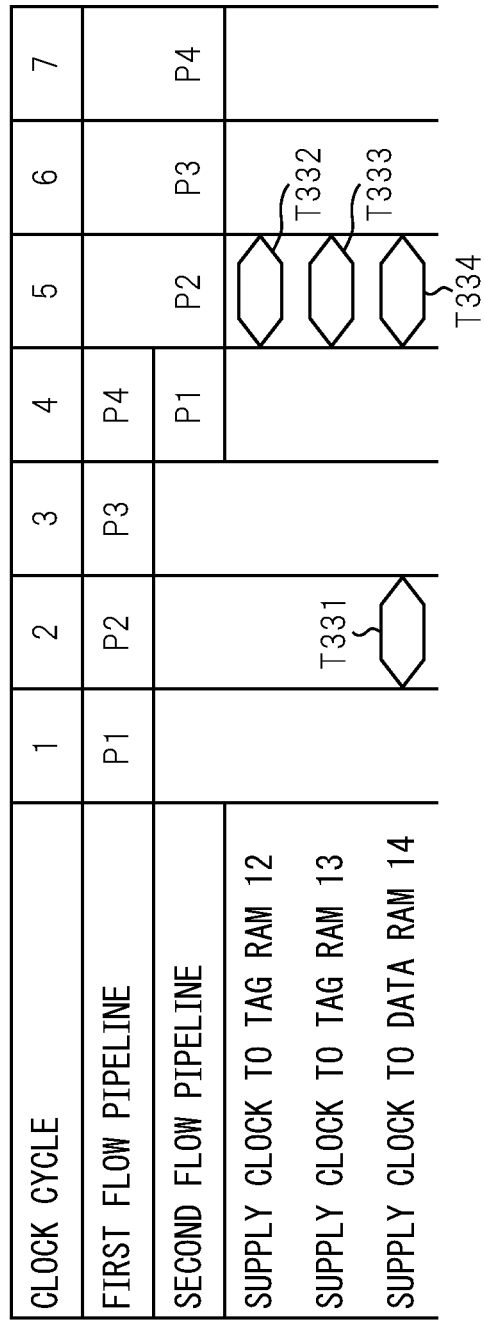
FIG. 15 is a time chart illustrating an example of a tag RAM and data RAM registration process.

FIG. 15 is a time chart illustrating an example of the registration process to the tag RAMs and the data RAM. At T331, since the registration process constitutes an access request other than an eviction access request, the OR circuit 303 receives an access request other than an eviction access request and thereby the data RAM clock control circuit 300 supplies a clock to the data RAM 14. At T332, the OR circuit 201 receives an access request other than an eviction access request and thereby the tag RAM clock control circuit 200 supplies a clock to the tag RAM 12. At T333, the OR circuit 407 receives an access request other than an eviction access request and thereby the tag RAM clock control circuit 400 supplies a clock to the tag RAM 13. At T334, the OR circuit 303 receives an access request other than an eviction access request and thereby the data RAM clock control circuit 300 supplies a clock to the data RAM 14.

Figure 16:
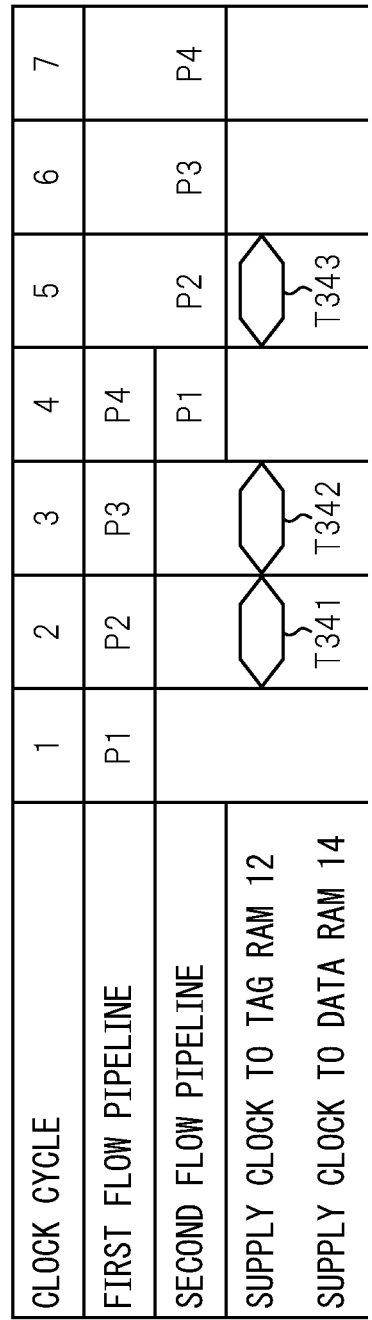
FIG. 16 is a time chart illustrating an example of a tag eviction process.

FIG. 16 is a time chart illustrating an example of a tag eviction process. The time chart of FIG. 16 indicates the eviction process in the case where the state before the eviction process is "S" or "E" and the state after the eviction process does not change. At T341, the OR circuit 201 receives an eviction access request, then the tag RAM clock control circuit 200 supplies a clock to the tag RAM 12. At T342, the latch circuit 304 holds the signal and thereby the tag RAM clock control circuit 200 supplies a clock to the tag RAM 13. At T343, the OR circuit 201 receives an access request other than an eviction access request and thereby the tag RAM clock control circuit 200 supplies a clock to the tag RAM 12. Note that as explained using FIG. 6 and FIG. 11, the state of the eviction line is not "M", so the data RAM clock control circuit 300 does not supply a clock to the data RAM 14.

Figure 17:
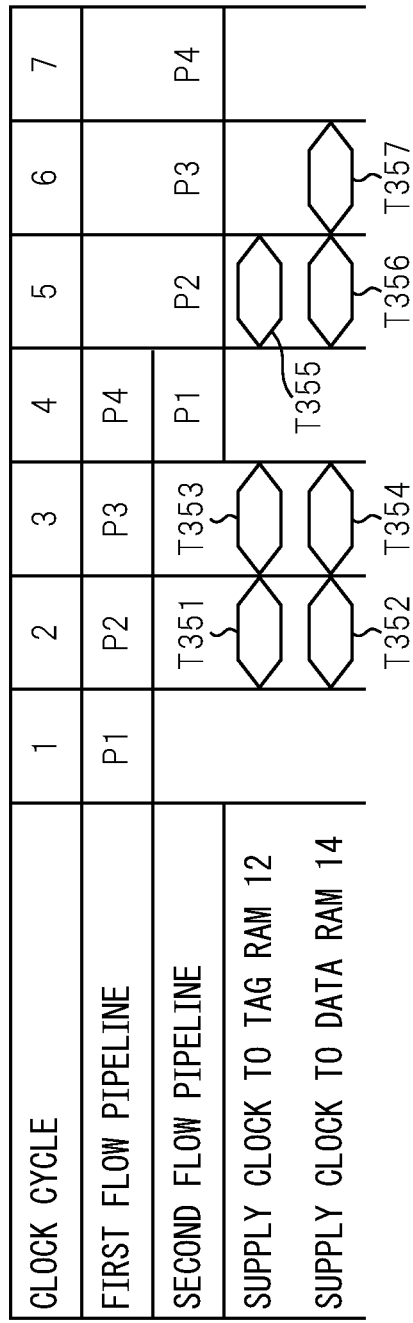
FIG. 17 is a time chart illustrating an example of a tag and data eviction process.

FIG. 17 is a time chart illustrating an example of a tag and data eviction process. The time chart of FIG. 17 indicates the eviction process in the case where the state before the eviction process is "M" and the state after the eviction process does not change. T351, T353, and T355 illustrated in FIG. 17 correspond to the T341, T342, and T343 illustrated in FIG. 16, respectively, so explanations will be omitted. At T352, the AND circuit 302 operates by the first eviction access request and "M" state of the data request circuit and thereby the data RAM clock control circuit 300 supplies a clock to the data RAM 14. At T354, the latch circuit 304 holds the output signal from the OR circuit 303 for a certain period and outputs the signal to the OR circuit 305 and thereby the data RAM clock control circuit 300 supplies a clock to the data RAM 14. At T356, the AND circuit 302 operates by the second eviction access request and the "M" state of the data request circuit and thereby the data RAM clock control circuit 300 supplies a clock to the data RAM 14. At T357, the latch circuit 304 holds the signal of the OR circuit 303 for a constant period and outputs the signal to the OR circuit 305 and thereby the data RAM clock control circuit 300 supplies a clock to the data RAM 14.

Figure 18:
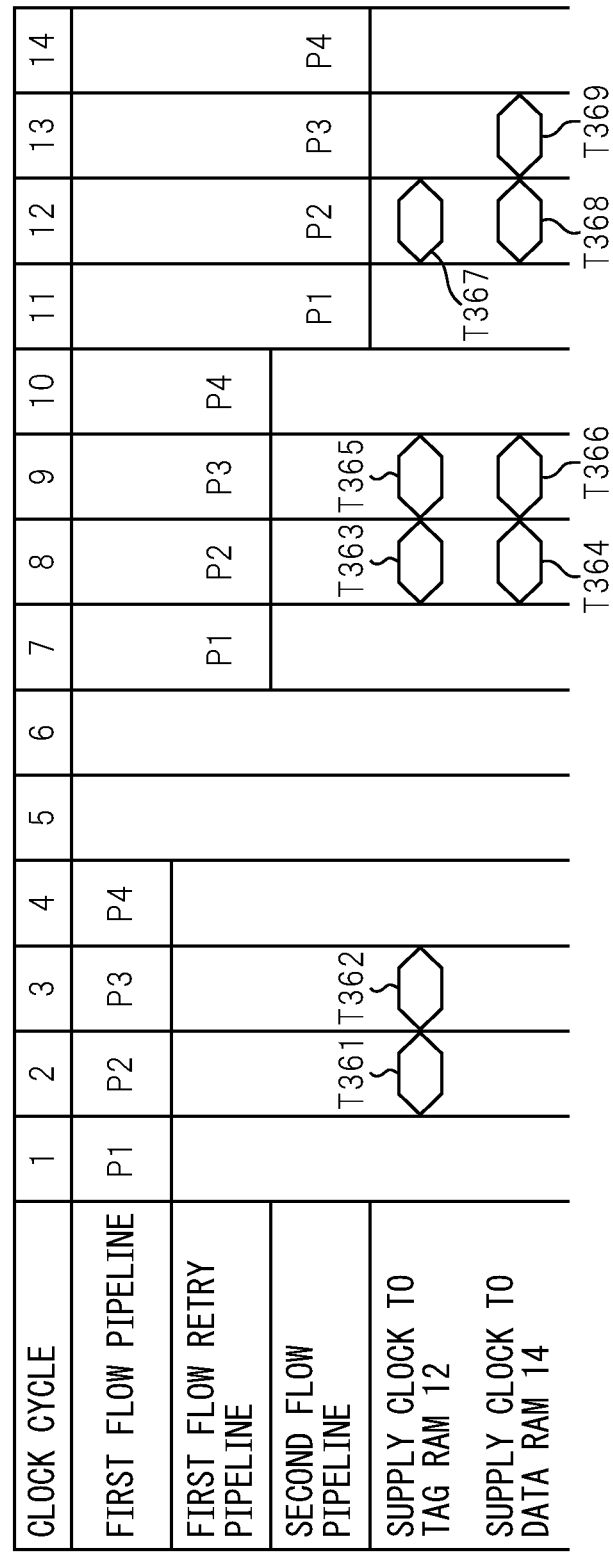
FIG. 18 is a time chart illustrating an example of a tag eviction process.

FIG. 18 is a time chart illustrating an example of a tag eviction process. The time chart of FIG. 18 indicates the eviction process in the case where the state before the eviction process is "S" or "E" and the state after the eviction process changes to "M". At T361 and T362, a process the same as the T341 and T342 illustrated in FIG. 16 is performed. After the seventh clock cycle, the state of the data read out by the data eviction circuit 33 at the first flow is changed to "M", so a process the same as FIG. 17 is repeated.

FIG. 19 is a time chart illustrating an example of a tag eviction process. The time chart of FIG. 19 indicates the eviction process in the case where the state before the eviction process is "M", error is detected in the first flow, and the state of the second flow does not change. T371 and T373 correspond to the T351 and T353 illustrated in FIG. 17, while T372 and T374 correspond to T352 and T354 illustrated in FIG. 17, so explanations will be omitted. At T375, error is detected. The supply of a clock to the tag RAM 12 of the second flow at T376 and T379 and the supply of a clock to the data RAM 14 of the second flow at T378 and T381 correspond to T351 and T353 and T352 and T354 depicted in FIG. 17, so the explanation will be omitted.

At the P2 cycle of the first flow retry, that is, T377, the AND circuit 401 receives the tag error detected at T375, while the AND circuit 404 receives the inverted signal of the eviction access request of the second flow. Furthermore, the AND circuit 406 receives the eviction access request of the first flow, so the tag RAM clock control circuit 400 supplies a clock to the tag RAM 13. At the P3 cycle of the first flow, that is, T380, the latch circuit 408 holds the output of the OR circuit 407, so the tag RAM clock control circuit 400 supplies a clock to the tag RAM 13. At the P2 cycle of the second flow, that is, T383, the OR circuit 407 receives the eviction access request of the second flow and operates, so the tag RAM clock control circuit 400 supplies a clock to the tag RAM 13.

FIG. 20 is a time chart illustrating an example of the tag eviction process. The time chart of FIG. 20 indicates the eviction process when the state before the eviction process is "M" and, after the first flow ends, the state changes to "S" or "E". The first flow of FIG. 20 is the same as the first flow of FIG. 17, so explanations will be omitted. In the second flow, the state is not "M", so the OR circuit 301 illustrated in FIG. 11 does not operate and the data RAM clock control circuit 300 does not supply a clock to the data RAM 14. On the other hand, at T396, due to the eviction access request of the second flow, the OR circuit 201 operates, so the tag RAM clock control circuit 200 supplies a clock to the tag RAM 12. When reading out the tag RAM in the second flow, if the state changes from "M" to "S" or "E" after the first flow, the data eviction circuit 33 does not supply a clock to the data RAM 14, so it is possible to suppress the power consumption of the primary cache memory 10.

FIG. 21A to FIG. 21D are flowcharts illustrating an example of a data process performed by the primary cache memory. First, the primary cache memory 10 receives a memory access request supplied from the instruction controlling unit 5 (S1001). The row decoder searches for the cache line of the tag RAM corresponding to the index address included in the memory access request (S1002). The comparison circuit 16 or 17 judges if a cache miss has occurred (S1003). In other words, the comparison circuit 16 or 17 compares whether a tag of the cache line found from the tag RAM 12 or 13 matches the tag of the data covered by the access request and, when not matching, outputs a cache miss signal.

In the case of a cache hit (S1003, No), the comparison circuit 16 or 17 outputs a signal specifying the cache hit tag and way to the data RAM 14 (S1101). The data RAM 14 supplies the data specified by the received tag and way to the instruction controlling unit 5 (S1102) whereupon the process ends.

When a cache miss occurs (S1003, Yes), the data control circuit 30 requests to a lower level memory the data for which the cache miss has occurred (S1004). The data control circuit 30 determines an eviction line from the read out tag (S1005). In other words, when a tag RAM is an n-way set associative type, the data control circuit 30 selects a way outputting the tag and specifies a tag line which the selected way outputs as the eviction line. The data control circuit 30 judges if the state of the eviction line is "M" (S1006). Further, when the state of the eviction line is "M" (S1006, Yes), as illustrated in FIG. 21B, the data control circuit 30, as an eviction process of the first flow, starts the supply of a clock to the tag RAM 12 or 13 and the data RAM 14 and reads out the eviction line (S1007). The data control circuit 30 judges if read error has occurred (S1008). When no read error occurs (S1008, no error), the routine proceeds to step S1009. When read error has occurred (S1008, error), the routine proceeds to step S1301.

As illustrated in FIG. 21B, the data control circuit 30 judges if the read out state of the eviction line is "M" (S1009). When the state of the eviction line is "M" (S1009, Yes), the data control circuit 30, as an eviction process of the second flow, supplies a clock to the tag RAM 12 or 13 to invalidate the eviction line and reads out the eviction line of the data RAM 14 (S1010). The data control circuit 30 writes the read out tag and data to a lower level memory (S1011). The data control circuit 30 supplies a clock to the tag RAMs and the data RAM to write the tag and data obtained from the lower level memory (S1012). The data RAM 14 outputs the data specified by the obtained tag and way to the instruction controlling unit 5 (S1013), whereupon the process ends.

Figure 21A:
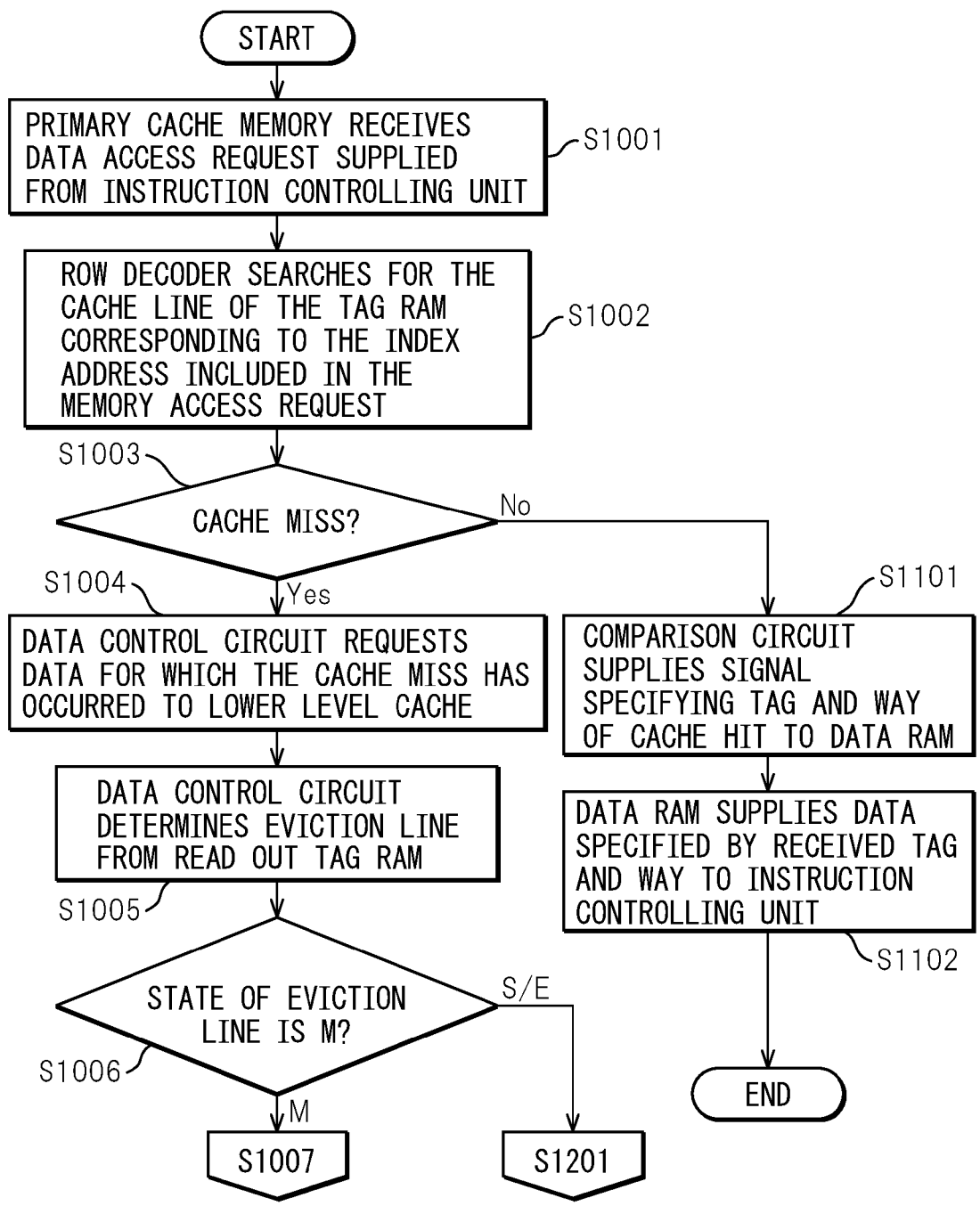
FIG. 21A is a flowchart illustrating an example of a data process performed by the cache memory device.
Figure 21C:
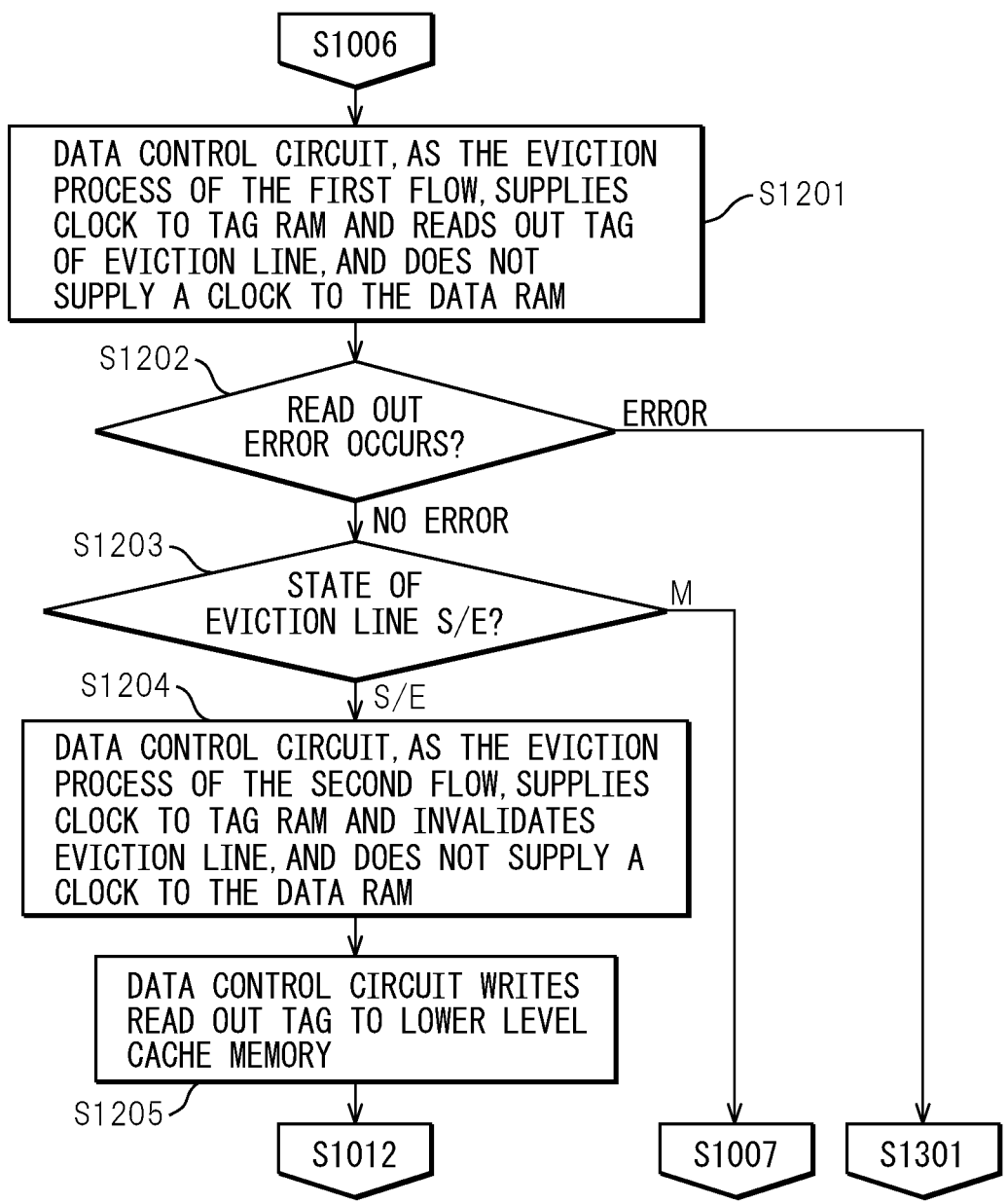
FIG. 21C is a flowchart illustrating an example of a data process performed by the cache memory device.

At the step S1006 illustrated in FIG. 21A, when the state of the eviction line is not "M", but the state of the eviction line is "S" or "E" (S1006, No), the data control circuit 30, as the eviction process of the first flow, starts the supply of a clock to the tag RAM 12 to read out the tag of the eviction line and does not supply a clock to the data RAM 14 (S1201). The data control circuit 30 judges if a read error has occurred (S1202). If no read error has occurred (S1202, no error), the routine proceeds to step S1203. If read error has occurred (S1202, error), the routine proceeds to step S1301. The data control circuit 30 judges if the read out state of the eviction line is "S" or "E" (S1203). When the state of the eviction line is "S" or "E" (S1203, Yes), the data control circuit 30, as the eviction process of the second flow, supplies a clock to the tag RAM to invalidate the eviction line and does not supply a clock to the data RAM 14 (S1204). The data control circuit 30 writes the read out tag in a lower level memory (S1205), then the routine proceeds to step S1012. When the state of the eviction line is "M" (S1203, No), the routine proceeds to step S1007.

At the step S1009 illustrated in FIG. 21B, when the state of the eviction line is not "M", but the state of the eviction line is "S" or "E" (S1009, No), the data control circuit 30, as the eviction process of the second flow, supplies a clock to the tag RAM 12 or 13 to invalidate the eviction line and does not supply a clock to the data RAM 14 (S1051). The data control circuit 30 writes the read out tag to a lower level memory (S1052), then the routine proceeds to step S1012.

As illustrated in FIG. 21D, the data control circuit 30, as the eviction process of the first flow, supplies a clock to the plurality of tag RAMs and the data RAM 14, respectively (S1301). The data control circuit 30 judges if read error has occurred (S1302). When no read error has occurred (S1302, no error), the routine proceeds to step S1303. When read error has occurred (S1302, error), the routine proceeds to step S1305. The data control circuit 30 judges if the state of the eviction line is "M" (S1303). When the state of the eviction line is "M" (S1303, Yes), the data control circuit 30, as the eviction process of the second flow, supplies a clock to the tag RAM 12 and the data RAM 14 to invalidate the eviction line (S1305), then the routine proceeds to step S1306. When the state of the eviction line is "S" or "E" (S1303, No), the data control circuit 30 supplies a clock to the tag RAM 12 to invalidate the eviction line and does not supply a clock to the data RAM 14 (S1304), then the routine proceeds to step S1306. The data control circuit 30 writes the read out tag and data to a lower level memory (S1306), whereupon the process ends.

All examples and conditional language recited herein after intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. A cache memory device that connects an instruction controlling unit outputting a memory access request for requesting data and a storage device storing data,
   the cache memory device comprising:
   a data memory unit that holds data for each cache line,
   a tag memory unit that holds, for each cache line corresponding to a cache line of the data memory unit, tag addresses specifying storage positions of data covered by the memory access request at the storage device and status data indicating states of the data of the data memory unit corresponding to the tag addresses,
   a search unit that searches for a cache line of the tag memory unit corresponding to an index address included in the memory access request,
   a comparison unit that compares a tag address held in the found cache line of the tag memory unit and a tag address included in the memory access request and, detects a "cache miss" and reads out the status information of the found cache line when the compared tag addresses do not match, and
   a controlling unit that requests data covered by the memory access request to the storage device when the comparison unit detects a cache miss and stops the supply of a clock to the data memory unit based on the read status information of the cache line when the cache line storing the data requested at the storage device is not present in the data memory unit.

2. The cache memory device according to claim 1, wherein the storage device is further connected to another cache memory device, and
   the controlling unit stops the supply of a clock to the data memory unit when the status information read out by the comparison unit indicates that the data of the data memory unit corresponding to the found cache line does not match with both of data of the data memory unit of the second cache memory device and data of the storage device or when it indicates that the data of the data memory unit corresponding to the found cache line, the data of the storage device, and the data of the data memory unit of the second cache memory device all match.

3. The cache memory device according to claim 1, wherein, when invalidating the found cache line of the tag memory unit, the controlling unit supplies a clock to the tag memory unit in the state where it stops the supply of a clock to the data memory unit.

4. The cache memory device according to claim 1, wherein, when the status information of the found cache line indicates that the data of the data memory unit and the data of the storage device do not match, the controlling unit starts the supply of a clock to the data memory unit, reads out data from the data memory unit, and reads out status information of the cache line from the tag memory unit and, when the read out status information indicates that the data of the data memory unit and the data of the storage device match, stops the supply of a clock to the data memory unit.

5. The cache memory device according to claim 1, wherein
   the cache memory device further has a second tag memory unit that stores tag addresses and status information for each cache line corresponding to a cache line of the data memory unit, and
   the controlling unit, when detecting an error during read out of the found cache line from the tag memory unit, supply a clock to the tag memory unit and the second tag memory unit to read out the found cache line from both the tag memory unit and the second tag memory unit.

6. The cache memory device according to claim 1, wherein the controlling unit further, when the status information of the found cache line indicates that the data of the data memory unit and the data of the storage device do not match, starts the supply of a clock to the data memory unit so as to read out data from the data memory unit and reads out status information of the cache line from the tag memory unit, when the read out status information indicates that the data of the data memory unit and the data of the storage device match, stops the supply of a clock to the data memory unit so as to suspend a process for evicting from the storage device the data held at the found cache line in the data memory unit and reads out status information of the cache line from the tag memory unit, and, when the read out status information indicates that the data of the found cache line of the data memory unit is different from the corresponding data in the storage device, starts the supply of a clock to the data memory unit so as to resume the process for evicting data held in the found cache line from the storage device.

7. A processor having a cache memory device that connects to a storage device storing data and holds part of the data that the storage device stores and an instruction controlling unit that outputs a memory access request requesting data to the cache memory device, wherein
   the cache memory device comprises: a data memory unit that holds data for each cache line,
   a tag memory unit that holds, for each cache line corresponding to a cache line of the data memory unit, tag addresses specifying storage positions of data covered by the memory access request at the storage device and status data indicating states of the data of the data memory unit corresponding to the tag addresses,
   a search unit that searches for a cache line of the tag memory unit corresponding to an index address included in the memory access request,
   a comparison unit that compares a tag address held in the found cache line of the tag memory unit and a tag address included in the memory access request and detects a "cache miss" and reads out the status information of the found cache line when the compared tag addresses do not match, and a controlling unit that, requests data covered by the memory access request to the storage device when the comparison unit detects a cache miss and stops the supply of a clock to the data memory unit based on the read status information of the cache line when the cache line storing the data requested at the storage device is not present in the data memory unit.

8. The processor according to claim 7, wherein
the storage device is further connected to another cache memory device, and
the controlling unit stops the supply of a clock to the data memory unit when the status information read out by the comparison unit indicates that the data of the data memory unit corresponding to the found cache line does not match with both of data of the data memory unit of the second cache memory device and data of the storage device or when it indicates that the data of the data memory unit corresponding to the found cache line, the data of the storage device, and the data of the data memory unit of the second cache memory device all match.

9. The processor according to claim 7, wherein,
when invalidating the found cache line of the tag memory unit, the controlling unit supplies a clock to the tag memory unit in the state where it stops the supply of a clock to the data memory unit.

10. The processor according to claim 7, wherein,
when the status information of the found cache line indicates that the data of the data memory unit and the data of the storage device do not match, the controlling unit starts the supply of a clock to the data memory unit, reads out data from the data memory unit, and reads out status information of the cache line from the tag memory unit and, when the read out status information indicates that the data of the data memory unit and the data of the storage device match, stops the supply of a clock to the data memory unit.

11. The processor according to claim 7, wherein
the cache memory device further has a second tag memory unit that stores tag addresses and status information for each cache line corresponding to a cache line of the data memory unit, and
the controlling unit, when detecting an error during read out of the found cache line from the tag memory unit, supply a clock to the tag memory unit and the second tag memory unit to read out the found cache line from both the tag memory unit and the second tag memory unit.

12. The processor according to claim 7, wherein the controlling unit further, when the status information of the found cache line indicates that the data of the data memory unit and the data of the storage device do not match, starts the supply of a clock to the data memory unit so as to read out data from the data memory unit and reads out status information of the cache line from the tag memory unit, when the read out status information indicates that the data of the data memory unit and the data of the storage device match, stops the supply of a clock to the data memory unit so as to suspend a process for evicting from the storage device the data held at the found cache line in the data memory unit and reads out status information of the cache line from the tag memory unit, and, when the read out status information indicates that the data of the found cache line of the data memory unit is different from the corresponding data in the storage device, starts the supply of a clock to the data memory unit so as to resume the process for evicting data held in the found cache line from the storage device.

13. A control method of a cache memory device that connects an instruction controlling unit outputting a memory access request for requesting data and a storage device storing data, and includes a data memory unit that holds data for each line and a tag memory unit that holds, for each cache line corresponding to a cache line of the data memory unit, tag addresses specifying storage positions of data covered by the memory access request at the storage device and status data indicating states of the data of the data memory unit corresponding to the tag addresses, the control method comprising:

searching for a cache line of the tag memory unit corresponding to an index address included in the memory access request;

comparing a tag addresses held in the found cache line of the tag memory unit and a tag address included in the memory access request;

detecting a cache miss and reading out the status information of the found cache line when the compared tag addresses do not match;

requesting data covered by the memory access request to the storage device when the comparison unit detects a cache miss; and stopping the supply of a clock to the data memory unit based on the read status information of the cache line when the cache line storing the data requested at the storage device is not present in the data memory unit.

14. The control method of a cache memory device according to claim 13, wherein
the storage device is further connected to another cache memory device, and
the controlling unit stops the supply of a clock to the data memory unit when the status information read out by the comparison unit indicates that the data of the data memory unit corresponding to the found cache line does not match with both of data of the data memory unit of the second cache memory device and data of the storage device or when it indicates that the data of the data memory unit corresponding to the found cache line, the data of the storage device, and the data of the data memory unit of the second cache memory device all match.

15. The control method of a cache memory device according to claim 13, wherein, when invalidating the found cache line of the tag memory unit, the controlling unit supplies a clock to the tag memory unit in the state where it stops the supply of a clock to the data memory unit.

16. The control method of a cache memory device according to claim 13, wherein, when the status information of the found cache line indicates that the data of the data memory unit and the data of the storage device do not match, the method starts the supply of a clock to the data memory unit, reads out data from the data memory unit, and reads out status information of the cache line from the tag memory unit and, when the read out status information indicates that the data of the data memory unit and the data of the storage device match, stops the supply of a clock to the data memory unit.

17. The control method of a cache memory device according to claim 13, wherein
the cache memory device further has a second tag memory unit that stores tag addresses and status information for each cache line corresponding to a cache line of the data memory unit, and
the controlling unit, when detecting an error during read out of the found cache line from the tag memory unit, supplies a clock to the tag memory unit and the second tag memory unit to read out the found cache line from both the tag memory unit and the second tag memory unit.

18. The control method of a cache memory device according to claim 13, wherein the controlling unit further, when the status information of the found cache line indicates that the data of the data memory unit and the data of the storage device do not match, starts the supply of a clock to the data memory unit so as to read out data from the data memory unit and reads out status information of the cache line from the tag memory unit, when the read out status information indicates that the data of the data memory unit and the data of the storage device match, stops the supply of a clock to the data memory unit so as to suspend a process for evicting from the storage device the data held at the found cache line in the data memory unit and reads out status information of the cache line from the tag memory unit, and, when the read out status information indicates that the data of the found cache line of the data memory unit is different from the corresponding data in the storage device, starts the supply of a clock to the data memory unit so as to resume the process for evicting data held in the found cache line from the storage device.

\* \* \* \* \*

UNITED STATES PATENT AND TRADEMARK OFFICE
CERTIFICATE OF CORRECTION

| | | |
|---|---|---|
| PATENT NO. | : 8,473,685 B2 | Page 1 of 1 |
| APPLICATION NO. | : 12/826967 | |
| DATED | : June 25, 2013 | |
| INVENTOR(S) | : Hiroaki Kimura | |

It is certified that error appears in the above-identified patent and that said Letters Patent is hereby corrected as shown below:

In the Claims

Column 21, Line 3, In Claim 7, delete "that," and insert -- that --, therefor.

Signed and Sealed this
Twenty-fourth Day of September, 2013

Teresa Stanek Rea
*Deputy Director of the United States Patent and Trademark Office*